United States Patent
Seregin et al.

(10) Patent No.: US 11,290,743 B2
(45) Date of Patent: Mar. 29, 2022

(54) INTERACTION OF ILLUMINATION COMPENSATION WITH INTER-PREDICTION

(71) Applicant: QUALCOMM Incorporated, San Diego, CA (US)

(72) Inventors: Vadim Seregin, San Diego, CA (US); Cheng-Teh Hsieh, Del Mar, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/705,027

(22) Filed: Dec. 5, 2019

(65) Prior Publication Data
US 2020/0186830 A1 Jun. 11, 2020

Related U.S. Application Data

(60) Provisional application No. 62/777,137, filed on Dec. 8, 2018.

(51) Int. Cl.
*H04N 19/573* (2014.01)
*H04N 19/513* (2014.01)
(Continued)

(52) U.S. Cl.
CPC ......... *H04N 19/573* (2014.11); *H04N 19/105* (2014.11); *H04N 19/132* (2014.11);
(Continued)

(58) Field of Classification Search
CPC .. H04N 19/573; H04N 19/105; H04N 19/132; H04N 19/159; H04N 19/176; H04N 19/186; H04N 19/46; H04N 19/513
See application file for complete search history.

(56) References Cited

U.S. PATENT DOCUMENTS

2015/0326881 A1 11/2015 Ikai et al.
2016/0165209 A1* 6/2016 Huang ................. H04N 13/161
348/43
(Continued)

FOREIGN PATENT DOCUMENTS

WO 2015192372 A1 12/2015
WO WO-2015192372 A1 * 12/2015 ........... H04N 19/186

OTHER PUBLICATIONS

Brass et al., High Efficiency Video Coding (HEVC), text specification, Draft 10 (for FDIS & Last Call), Document: JCTVC-L1003_v34. Joint Collaborative Team on Video Coding (JCT-VC) of ITU-T SG 16 WP 3 and ISO/IEC JTC 1/SC 29/WG 11-12th Meeting: Geneva, CH, Jan. 14-13, 2013. Entire Document. (Year: 2013).*

(Continued)

*Primary Examiner* — Maria E Vazquez Colon
(74) *Attorney, Agent, or Firm* — Polsinelli LLP

(57) ABSTRACT

Systems and techniques for performing illumination compensation in processing video data include deriving one or more illumination compensation parameters for a block of a picture based on one or more tools which may be used for inter-prediction of the block. Illumination compensation can be selectively applied for the block based on whether bi-directional prediction is to be applied for the inter-prediction of the block. In some cases if it is determined that bi-directional prediction is to be applied for inter-prediction of the block, illumination compensation may be avoided for the block.

36 Claims, 14 Drawing Sheets

(51) Int. Cl.
*H04N 19/159* (2014.01)
*H04N 19/176* (2014.01)
*H04N 19/132* (2014.01)
*H04N 19/105* (2014.01)
*H04N 19/186* (2014.01)
*H04N 19/46* (2014.01)

(52) U.S. Cl.
CPC ......... *H04N 19/159* (2014.11); *H04N 19/176* (2014.11); *H04N 19/186* (2014.11); *H04N 19/46* (2014.11); *H04N 19/513* (2014.11)

(56) References Cited

U.S. PATENT DOCUMENTS

| | | | |
|---|---|---|---|
| 2018/0098087 A1 | 4/2018 | Li et al. | |
| 2019/0297325 A1* | 9/2019 | Lim | H04N 19/159 |
| 2020/0099941 A1* | 3/2020 | Li | H04N 19/159 |
| 2020/0112739 A1* | 4/2020 | Xu | H04N 19/105 |
| 2020/0221117 A1* | 7/2020 | Liu | H04N 19/109 |
| 2020/0244990 A1* | 7/2020 | Bordes | H04N 19/583 |
| 2021/0044821 A1* | 2/2021 | Galpin | H04N 19/159 |
| 2021/0195227 A1* | 6/2021 | Lee | H04N 19/132 |
| 2021/0235074 A1* | 7/2021 | Liu | H04N 19/52 |
| 2021/0235092 A1* | 7/2021 | Liu | H04N 19/463 |
| 2021/0235110 A1* | 7/2021 | Liu | H04N 19/176 |

OTHER PUBLICATIONS

Partial International Search Report—PCT/US2019/065001—Isa/epo —dated Mar. 13, 2020.
Seregin (QUALCOMM) V., et al., "CE10-related; Unidirectional Illumination Compensation", 125. MPEG Meeting, Jan. 14, 2019-Jan. 18, 2019, Marrakech, (Motion Picture Expert Group or ISO/IEC JTC1/SC29/WG11), No. m45776, Jan. 3, 2019 (Jan. 3, 2019), XP030198236, 3 pages, Retrieved from the Internet: URL:http://phenix.int-evry.fr/mpeg/doc_end_user/documents/125_Marrakech/wg11/m45776-JVET-M0500-v1-JVET-M500.zip. JVET-M500.docx, [retrieved on Jan. 3, 2019] the whole document.

* cited by examiner

INTERACTION OF ILLUMINATION COMPENSATION WITH INTER-PREDICTION

CROSS-REFERENCE TO RELATED APPLICATIONS

This application claims the benefit of U.S. Provisional Application No. 62/777,137, filed Dec. 8, 2018, which is hereby incorporated by reference, in its entirety and for all purposes.

FIELD

This application is related to video coding and compression. More specifically, this application relates to systems and methods of performing improved local illumination compensation.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

Illumination compensation can be used to efficiently compensate variations in illumination between one or more pictures. In some implementations, techniques and systems are described herein for estimating or deriving one or more illumination compensation parameters for a block of a picture based one or more tools which may be used for inter-prediction of the block. For example, illumination compensation can be selectively applied for the block based on whether bi-directional prediction is to be applied for the inter-prediction of the block. In some examples, one or more illumination compensation parameters for the block can be derived after bi-directional prediction has been performed on the block, the one or more illumination compensation parameters based on one or more of a bi-directional predictor of the block, or one or more neighboring blocks of two or more reference blocks used in the bi-directional prediction. In some examples, illumination compensation for the block can be based on whether one or more motion vectors for the block are obtained by modifying one or more motion vectors of the one or more other blocks. In some examples, the estimating or deriving the one or more illumination compensation parameters for the block can also be based on one or more characteristics of the block, such as a size of the block, whether the block includes multiple partitions, among others.

According to at least one example, a method of decoding video data is provided. The method includes obtaining an encoded video bitstream including video data. The method further includes obtaining, from the encoded video bitstream, a current block of a picture of the video data. The method further includes determining whether to apply bi-directional prediction for inter-prediction of the current block. The method further includes, subsequent to determining whether to apply bi-directional prediction for inter-prediction of the current block, determining whether to apply illumination compensation for the current block.

In another example, an apparatus for decoding video data is provided. The apparatus includes a memory and a processor implemented in circuitry. The processor is configured to and can obtain an encoded video bitstream including video data. The processor is further configured to and can obtain, from the encoded video bitstream, a current block of a picture of the video data. The processor is further configured to and can determine whether to apply bi-directional prediction for inter-prediction of the current block. The processor is further configured to and can, subsequent to determining whether to apply bi-directional prediction for inter-prediction of the current block, determine whether to apply illumination compensation for the current block.

In another example, a non-transitory computer-readable medium is provided that has stored thereon instructions that, when executed by one or more processors, cause the one or more processors to: obtain an encoded video bitstream including video data; obtain, from the encoded video bitstream, a current block of a picture of the video data; determine whether to apply bi-directional prediction for inter-prediction of the current block; and subsequent to determining whether to apply bi-directional prediction for inter-prediction of the current block, determine whether to apply illumination compensation for the current block.

In another example, an apparatus for decoding video data is provided. The apparatus includes means for obtaining an encoded video bitstream including video data. The apparatus further includes means for obtaining, from the encoded video bitstream, a current block of a picture of the video data. The apparatus further includes means for determining whether to apply bi-directional prediction for inter-prediction of the current block. The apparatus further includes means for, subsequent to determining whether to apply bi-directional prediction for inter-prediction of the current block, determining whether to apply illumination compensation for the current block.

According to at least one example, a method of encoding video data is provided. The method includes obtaining a current block of a picture of video data. The method further includes determining whether to apply bi-directional prediction for inter-prediction of the current block. The method further includes, subsequent to determining whether to apply bi-directional prediction for inter-prediction of the current block, determining whether to apply illumination compensation for the current block. The method further includes generating an encoded video bitstream including at least a portion of the current block.

In another example, an apparatus for encoding video data is provided. The apparatus includes a memory and a processor implemented in circuitry. The processor is configured to and can obtain a current block of a picture of video data.

The processor is further configured to and can determine whether to apply bi-directional prediction for inter-prediction of the current block. The processor is further configured to and can, subsequent to determining whether to apply bi-directional prediction for inter-prediction of the current block, determine whether to apply illumination compensation for the current block. The processor is further configured to and can generate an encoded video bitstream including at least a portion of the current block.

In another example, a non-transitory computer-readable medium is provided that has stored thereon instructions that, when executed by one or more processors, cause the one or more processors to: obtain a current block of a picture of video data; determine whether to apply bi-directional prediction for inter-prediction of the current block; subsequent to determining whether to apply bi-directional prediction for inter-prediction of the current block, determine whether to apply illumination compensation for the current block; and generate an encoded video bitstream including at least a portion of the current block.

In another example, an apparatus for encoding video data is provided. The apparatus includes means for obtaining a current block of a picture of video data. The apparatus further includes means for determining whether to apply bi-directional prediction for inter-prediction of the current block. The apparatus further includes means for, subsequent to determining whether to apply bi-directional prediction for inter-prediction of the current block, determining whether to apply illumination compensation for the current block. The apparatus further includes means for generating an encoded video bitstream including at least a portion of the current block.

In some aspects of the methods, apparatuses, and computer-readable media described above, determining whether to apply illumination compensation for the current block can be based on whether bi-directional prediction is to be applied for the inter-prediction of the current block.

Some aspects of the methods, apparatuses, and computer-readable media described above further include determining that bi-directional prediction is to be applied for inter-prediction of the current block; and determining not to apply illumination compensation for the current block based on determining that bi-directional prediction is to be applied for inter-prediction of the current block.

Some aspects of the methods, apparatuses, and computer-readable media described above further include determining that bi-directional prediction is not to be applied for inter-prediction of the current block; and applying illumination compensation for the current block based on determining that determining that bi-directional prediction is not to be applied for inter-prediction of the current block.

In some aspects of the methods, apparatuses, and computer-readable media described above, applying illumination compensation for the current block includes deriving one or more illumination compensation parameters for the current block using one or more neighboring blocks of current block and one or more neighboring blocks of a reference block used for inter-prediction of the current block.

In some aspects of the methods, apparatuses, and computer-readable media described above, determining whether to apply bi-directional prediction for inter-prediction of the current block is based on an illumination compensation flag associated with motion information for the current block.

In some aspects of the methods, apparatuses, and computer-readable media described above, a value of the illumination compensation flag being set to false indicates that bi-directional prediction is to be applied for inter-prediction of the current block and illumination compensation is not to be applied for the current block.

In some aspects of the methods, apparatuses, and computer-readable media described above, a value of the illumination compensation flag being set to true indicates that bi-directional prediction is not to be applied for inter-prediction of the current block and illumination compensation is to be applied for the current block.

Some aspects of the methods, apparatuses, and computer-readable media described above further include obtaining, from the encoded video bitstream, signaling information; determining whether the signaling information includes an illumination compensation flag associated with motion information for the current block; and determining whether to apply bi-directional prediction for inter-prediction of the current block based on determining whether the signaling information includes the illumination compensation flag associated with motion information for the current block.

Some aspects of the methods, apparatuses, and computer-readable media described above further include determining that the signaling information does not include the illumination compensation flag; and determining that bi-directional prediction is to be applied for inter-prediction of the current block and illumination compensation is not to be applied for the current block, based on the signaling information not including the illumination compensation flag.

Some aspects of the methods, apparatuses, and computer-readable media described above further include applying one of bi-directional prediction for inter-prediction of the current block or illumination compensation for the current block; and reconstructing a sample of the current block based on the bi-directional prediction for inter-prediction applied to the current block or illumination compensation applied to the current block.

In some aspects of the methods, apparatuses, and computer-readable media described above, reconstructing the sample of the current block further comprises applying a residual value.

Some aspects of the methods, apparatuses, and computer-readable media described above further include determining that bi-directional prediction is to be applied for inter-prediction of the current block; determining that illumination compensation is to be applied for the current block; and deriving illumination compensation parameters for the current block using one or more neighboring blocks of the current block and one or more of: a first set of one or more neighboring blocks of a first reference block used for inter-prediction of the current block, a second set of one or more neighboring blocks of a second reference block used for inter-prediction of the current block, or a combination of the first set of one or more neighboring blocks and the second set of one or more neighboring blocks.

In some aspects of the methods, apparatuses, and computer-readable media described above, the one or more neighboring blocks of the current block include one or more of a top neighboring block or a left neighboring block of the current block, the first set of one or more neighboring blocks includes one or more of a top neighboring block or a left neighboring block of the first reference block, and the second set of one or more neighboring blocks includes one or more of a top neighboring block or a left neighboring block of the second reference block.

Some aspects of the methods, apparatuses, and computer-readable media described above further include determining that an illumination compensation flag is associated with motion information for the current block; and determining whether to use the illumination compensation flag for comparing the motion information for the current block against stored motion information in a motion information candidate list, wherein the motion information for the current block is added to the motion information candidate list based on the comparison.

Some aspects of the methods, apparatuses, and computer-readable media described above further include determining whether one or more motion vectors for the current block are obtained by modifying one or more motion vectors of one or more other blocks; and determining whether to apply illumination compensation for the current block based on whether one or more motion vectors for the current block are obtained by modifying one or more motion vectors of the one or more other blocks.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
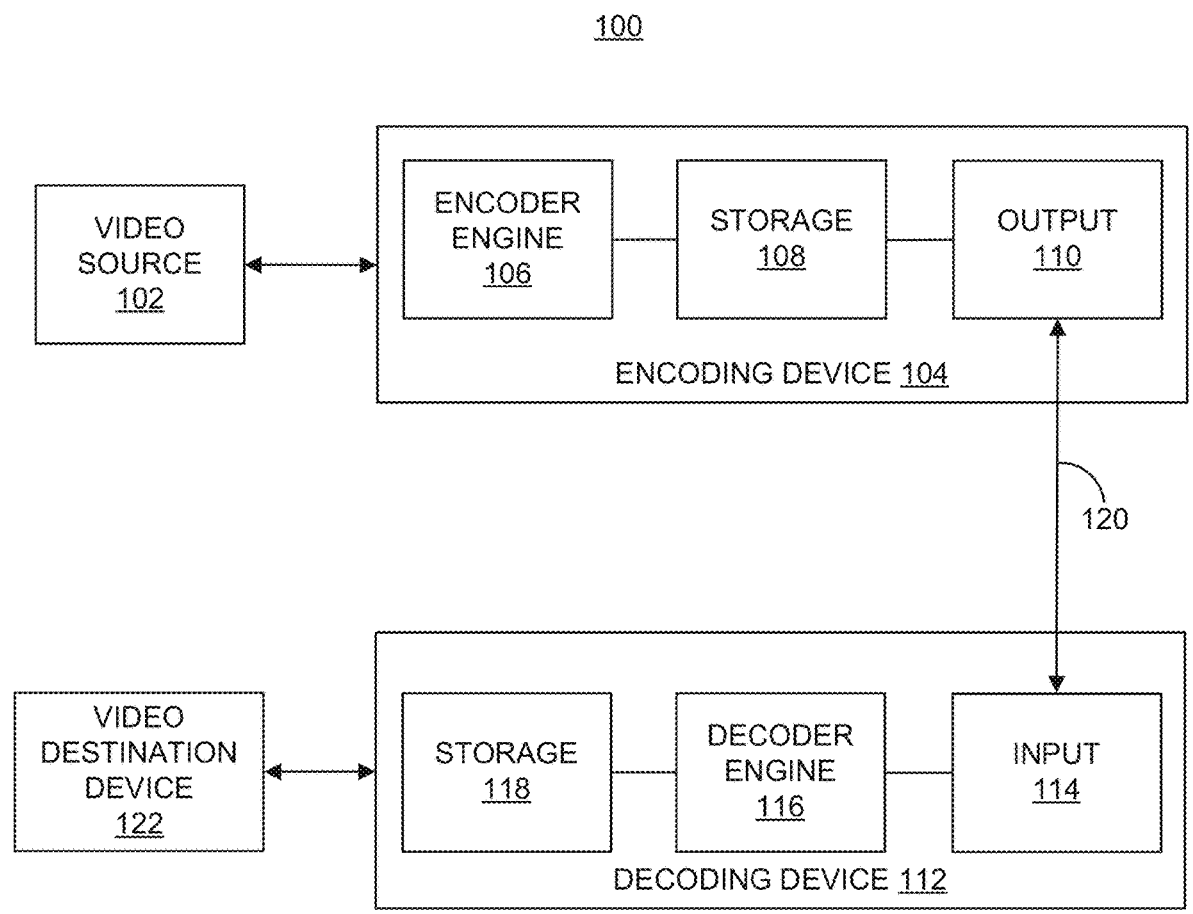
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplar) embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some examples, one or more systems and methods of processing video data are directed to deriving or estimating illumination compensation (IC) parameters in block based video coding. In some instances, a video encoder and/or a video decoder can perform local illumination compensation (LIC) (or illumination compensation) to efficiently code variations in illumination (e.g., brightness) between one or more pictures. The video encoder and/or the video decoder can determine one or more IC parameters (e.g., an offset, one or more scaling factors, a shift number, or other suitable IC parameters) for the coding block or coding unit being encoded or decoded. The IC parameters can be determined based on samples of multiple reference blocks, samples of one or more neighboring blocks of the current block, and/or other information. The video decoder can utilize the IC parameters and/or other data to construct predictive data for decoding the current block.

The techniques described herein can be applied to any of the existing video codecs (e.g., High Efficiency Video Coding (HEVC), Advanced Video Coding (AVC), or other suitable existing video codec), or can be an efficient coding tool for any future video coding standards, such as, for example, the joint exploration model (JEM) and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/EC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model). A new video coding standard being developed by JVET is called Versatile Video Coding (VVC).

Many embodiments described herein provide examples using the JEM model, the HEVC standard, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, IX: prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 13. An example of specific details of the decoding device 112 is described below with reference to FIG. 14.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RelPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 (TB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder. In some instances, for single direction inter-prediction of a PU, the encoder can generate a single AMVP candidate list. In some instances, for bi-directional prediction of a PU, the encoder can generate two AMVP candidate lists, one using motion data of spatial and temporal neighboring PUs from the forward prediction direction and one using motion data of spatial and temporal neighboring PUs from the backward prediction direction.

Figure 2B:
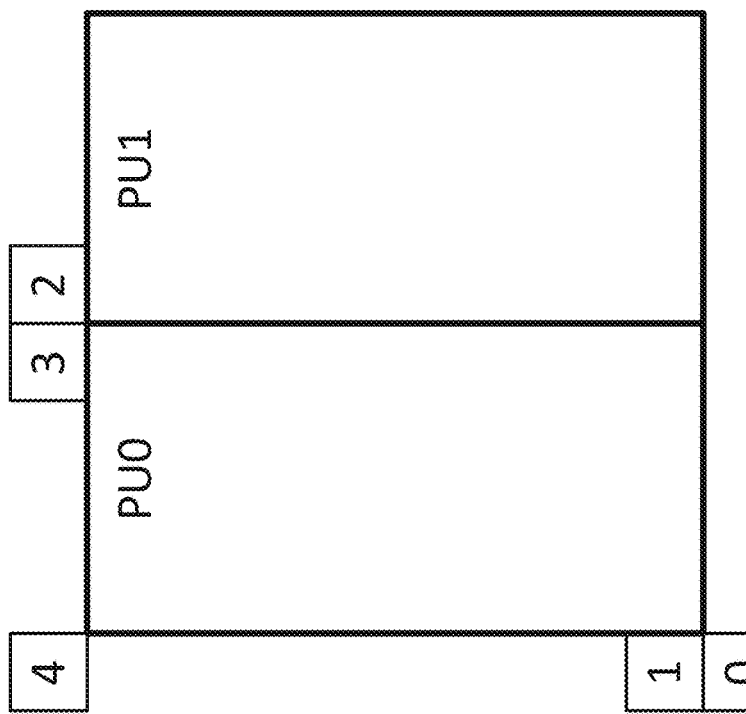
FIG. 2B is a conceptual diagram illustrating example spatial neighboring motion vector candidates for an advanced motion vector prediction (AMVP) mode, in accordance with some examples.
Figure 2A:
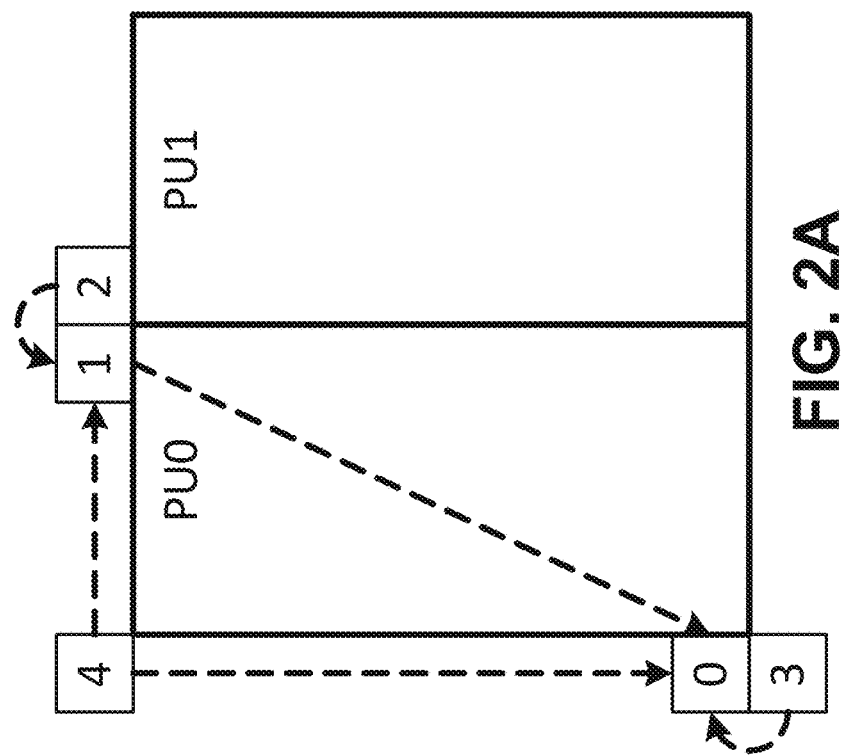
FIG. 2A is a conceptual diagram illustrating example spatial neighboring motion vector candidates for a merge mode, in accordance with some examples.

The candidates for both modes can be derived from spatial and/or temporal neighboring blocks. For example, FIG. 2A and FIG. 2B include conceptual diagrams illustrating spatial neighboring candidates in HEVC. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder can form a merging candidate list by considering merging candidates from various motion data positions. For example, as shown in FIG. 2A, up to four spatial MV candidates can be derived with respect spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
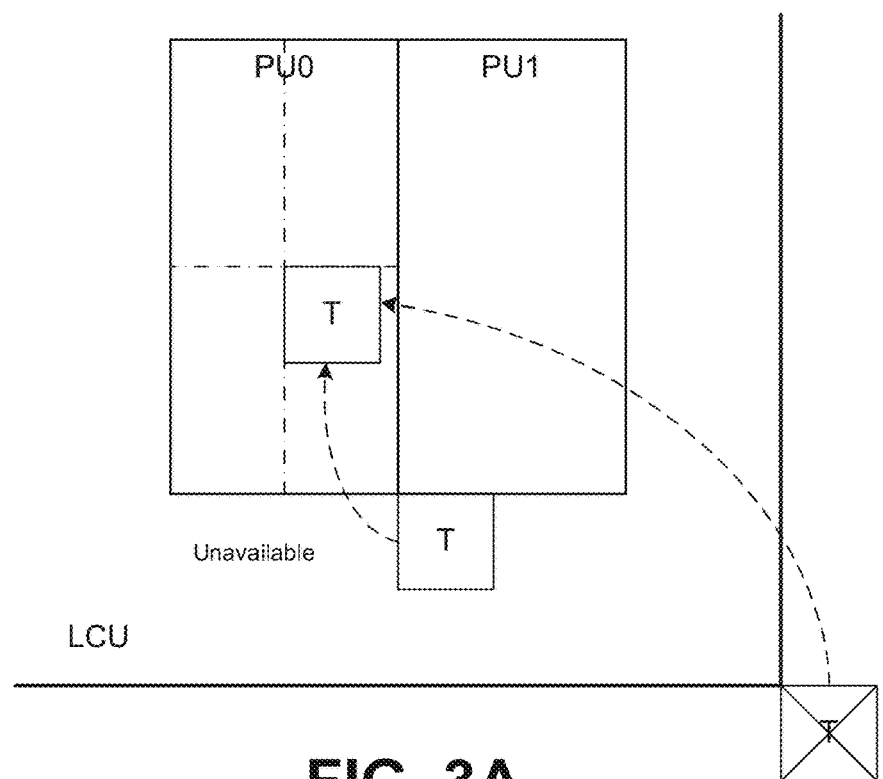
FIG. 3A is a conceptual diagram illustrating an example temporal motion vector predictor (TMVP) candidate, in accordance with some examples.
Figure 3B:
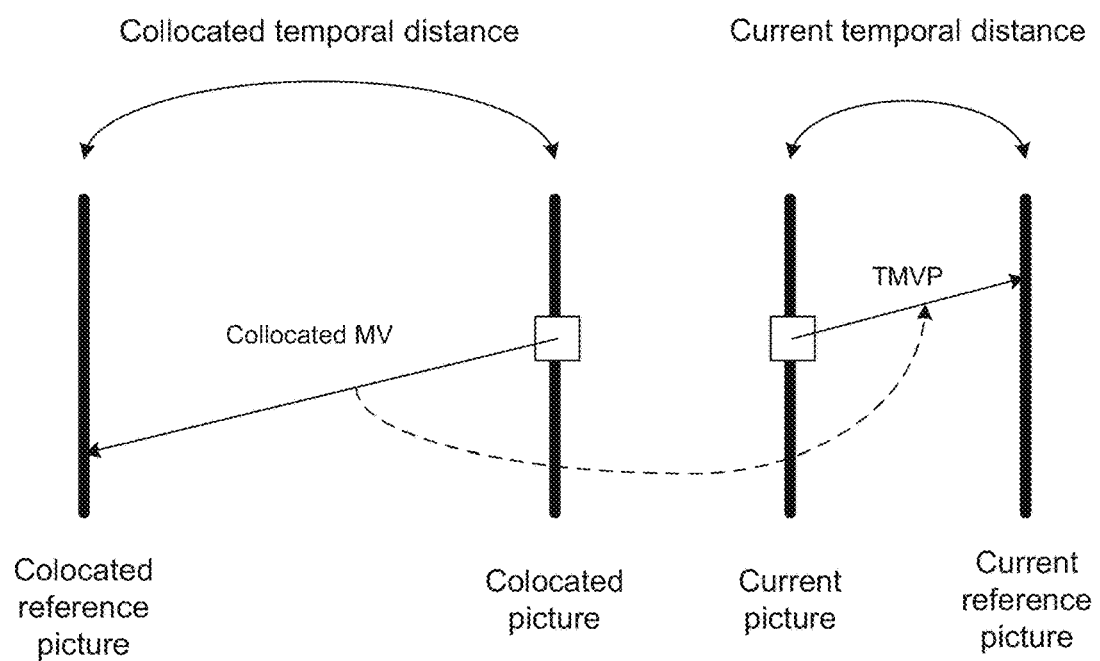
FIG. 3B is a conceptual diagram illustrating an example of motion vector scaling, in accordance with some examples.

FIG. 3A and FIG. 3B include conceptual diagrams illustrating temporal motion vector prediction in HEVC. A temporal motion vector predictor (TMVP) candidate, if enabled and available, is added into a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

Another aspect of merge and AMVP modes includes a pruning process for candidate insertion. For example, candidates from different blocks may happen to be the same, which decreases the efficiency of a merge and/or AMVP candidate list. A pruning process can be applied to solve this problem. The pruning process compares one candidate against the others in the current candidate list to avoid inserting identical candidate in certain extent. To reduce the complexity, only limited numbers of pruning process is applied instead of comparing each potential one with all the other existing ones.

There are various related motion-prediction technologies. One prediction technology is local illumination compensation (LIC) or luminance compensation. Illumination compensation has been proposed for HEVC. For example, in JCTVC-C041, Partition Based Illumination Compensation (PBIC) was proposed. Different from weighted prediction (WP), which enables and/or disables WP, and signals WP parameters at the slice level (as described below), PBIC enables and/or disables illumination compensation (IC) and signals IC parameters at the prediction unit (PU) level to handle local illumination variation. In JVET-B0023, the block-based LIC is extended to the CU, similar to PU in HEVC, CU becomes the basic unit which carries the motion information in the QTBT structure.

Similar to Weighted Prediction (WP), which is described in more detail below, a scaling factor (also denoted by a) and an offset (also denoted by b) is used in IC, and the shift number is fixed to be 6. An IC flag is coded for each PU to indicate whether IC applies for current PU or not. If IC applies for the PU, a set of IC parameters (e.g., a and b) are signaled to the decoder and is used for motion compensation. In some examples, to save bits spent on IC parameters, the chroma component shares the scaling factors with luma component and a fixed offset 128 is used.

In 3D-HEVC, IC is enabled for inter-view prediction. Different from WP and PBIC, which signals IC parameters explicitly, it derives IC parameters based on neighboring samples of current CU and neighboring samples of reference block. IC applies to 2N×2N partition mode only. For AMVP mode, one IC flag is signaled for each CU that is predicted from an inter-view reference picture. For merge mode, to save bits, an IC flag is signaled only when the merge index of the PU is not equal to 0. In some cases, IC does not apply to CU that is only predicted from temporal reference pictures.

With respect to derivation of IC parameters, the linear IC model used in inter-view prediction is shown in Equation (1):

$$p(i,j)=a*r(i+dv_x,j+dv_y)+b, \text{ where}(i,j) \in PU_c \quad \text{Equation (1)}$$

Here, $PU_c$ is the current PU, (i,j) is the coordinate of pixels in $PU_c$, $(dv_x, dv_y)$ is the disparity vector of $PU_c$, p(i,j) is the prediction of $PUL_c$, r is the PU's reference picture from the neighboring view, and a and b are parameters of the linear IC model.

Figure 4B:
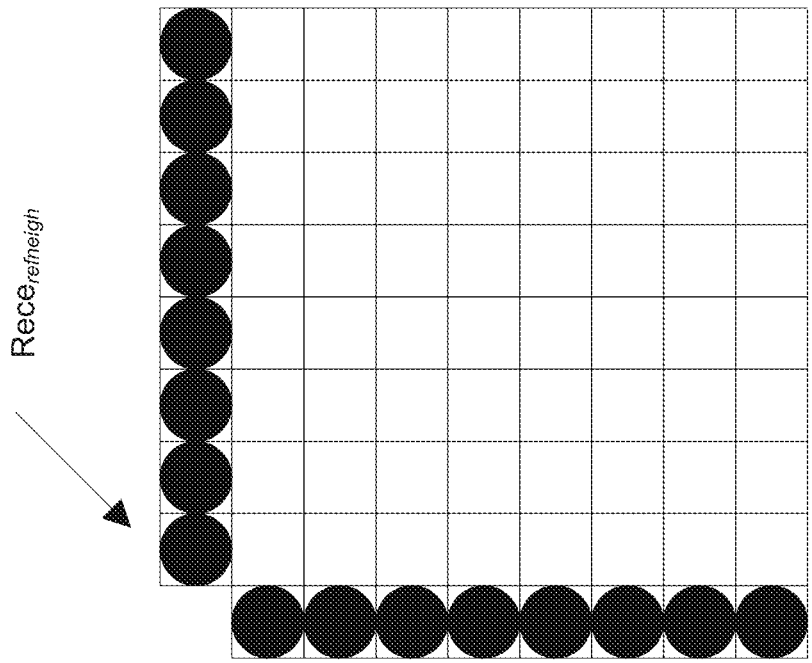
FIG. 4B is a conceptual diagram illustrating an example of neighboring samples of a reference block used for estimating IC parameters for a current coding unit, in accordance with some examples.
Figure 4A:
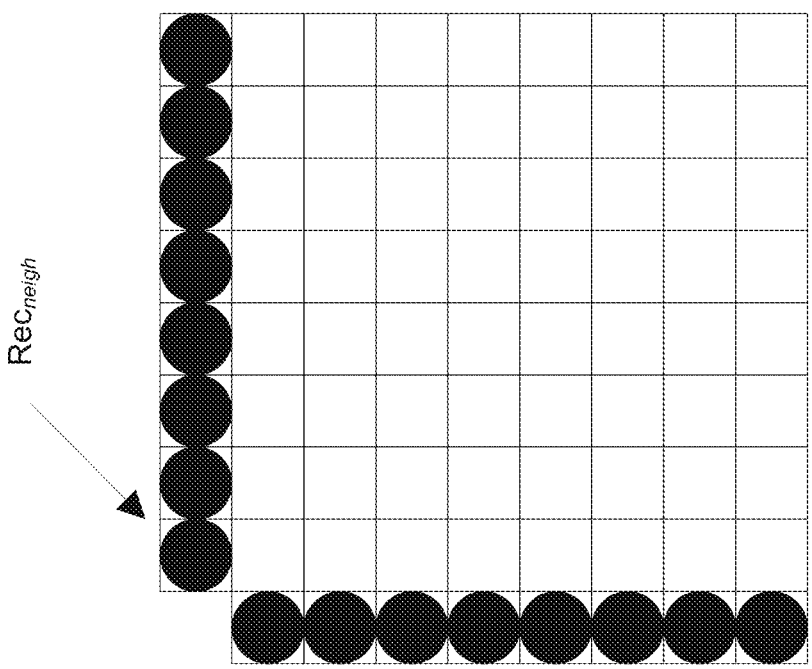
FIG. 4A is a conceptual diagram illustrating an example of neighboring samples of a current coding unit used for estimating illumination compensation (IC) parameters for the current coding unit, in accordance with some examples.

To estimate parameter a and b for a PU, two sets of pixels, as shown in FIG. 4A and FIG. 4B are used. The first set of pixels are shown in FIG. 4A and include available reconstructed neighboring pixels in a left column and an above row of the current CU (the CU that contains the current PU). The second set of pixels are shown in FIG. 4B and include corresponding neighboring pixels of the current CU's reference block. The reference block of the current CU is found by using the current PU's disparity vector.

Let $Rec_{neig}$ and $Rec_{refneig}$ denote used neighboring pixel set of the current CU and its reference block, respectively, and let 2N denote the pixel number in $Rec_{neig}$ and $Rec_{refneig}$. Then, a and b can be calculated as:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad \text{Equation (2)}$$

$$b = \frac{\sum_{i=0}^{2N-1} Rec_{neig}(i) - a \cdot \sum_{i=0}^{2N-1} Rec_{refneig}(i)}{2N} \quad \text{Equation (3)}$$

In some cases, only a is used in the linear model and b is always set equal to 0. In some cases, only b is used and a is always set equal to 1.

In HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is p(x, y), then p'(x, y)=((a*p(x, y)+(1<<(s−1)))>>s)+b instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figures 5A, 5B:
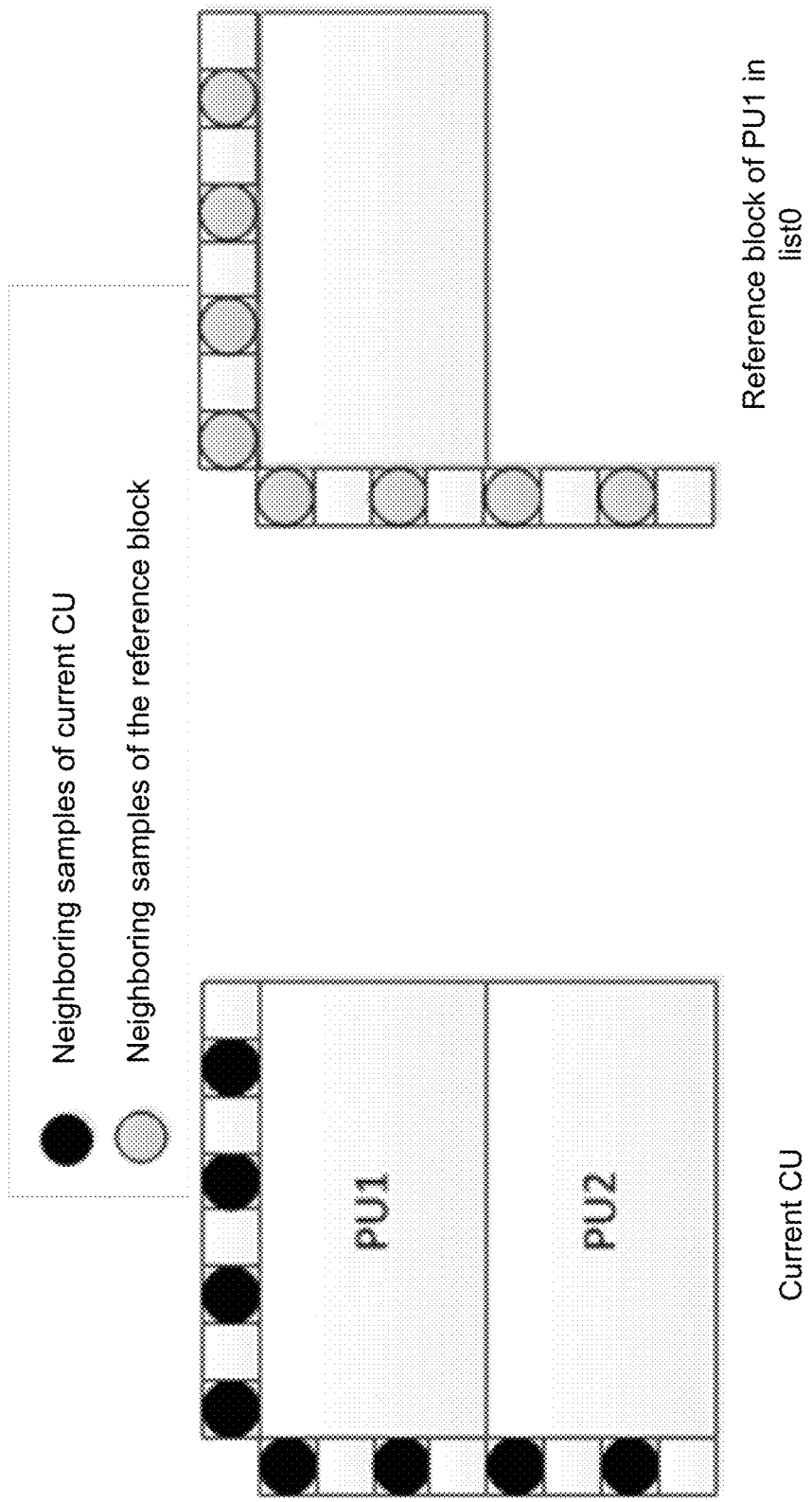
FIG. 5A is a conceptual diagram illustrating an example of neighboring samples of a current coding unit used for derivation of illumination compensation (IC) parameters for the current coding unit, in accordance with some examples.
FIG. 5B is a conceptual diagram illustrating an example of neighboring samples of a reference block used for derivation of IC parameters for a current coding unit, in accordance with some examples.

In JEM, a local illumination compensation (LIC) method was proposed. A description of LIC in JEM can be found in JVET-G1001. With respect to LIC in JVET, LIC is based on a linear model for illumination changes, using a scaling factor a and an offset b. Such LIC is enabled or disabled adaptively for each inter-mode coded coding unit (CU). When LIC applies for a CU, a least square error method is employed to derive the parameters a and b by using the neighboring samples of the current CU and their corresponding reference samples. For example, as illustrated in FIG. 5A and FIG. 5B, the subsampled (2:1 subsampling) neighboring samples of the CU and the corresponding pixels (identified by motion information of the current CU or sub-CU) in the reference picture are used. In some examples, the IC parameters are derived and applied for each prediction direction separately. In some examples, an illumination compensation flag can be signalled for a CU to indicate whether LIC applies or not. In some examples, such as when a CU is coded with merge mode, the illumination compensation flag may be copied from neighboring blocks, in a way similar to motion information copy in merge mode.

According to LIC, the luminance value (of a sample, or pixel) is compensated for in the inter-prediction in a linear form, a*p+b, where p is a sample in inter-prediction, a is a scaling factor, and b is an offset. The scaling factor a and offset b are the parameters derived using neighboring samples of the current block and neighboring samples of the reference block (e.g., as shown in FIG. 5A and FIG. 5B), which is used for inter-prediction. For example, inter-prediction can first be derived using motion information signaled for an inter-coded block, then parameters a and b can be derived, and prediction refinement can then be performed. Parameters can be derived by minimizing the difference between the neighboring reconstructed samples of the current block and the neighboring samples of the reference block used for inter-prediction. In some cases, the minimization can be performed using a linear least squares method and/or any other suitable minimization method.

Figure 6:
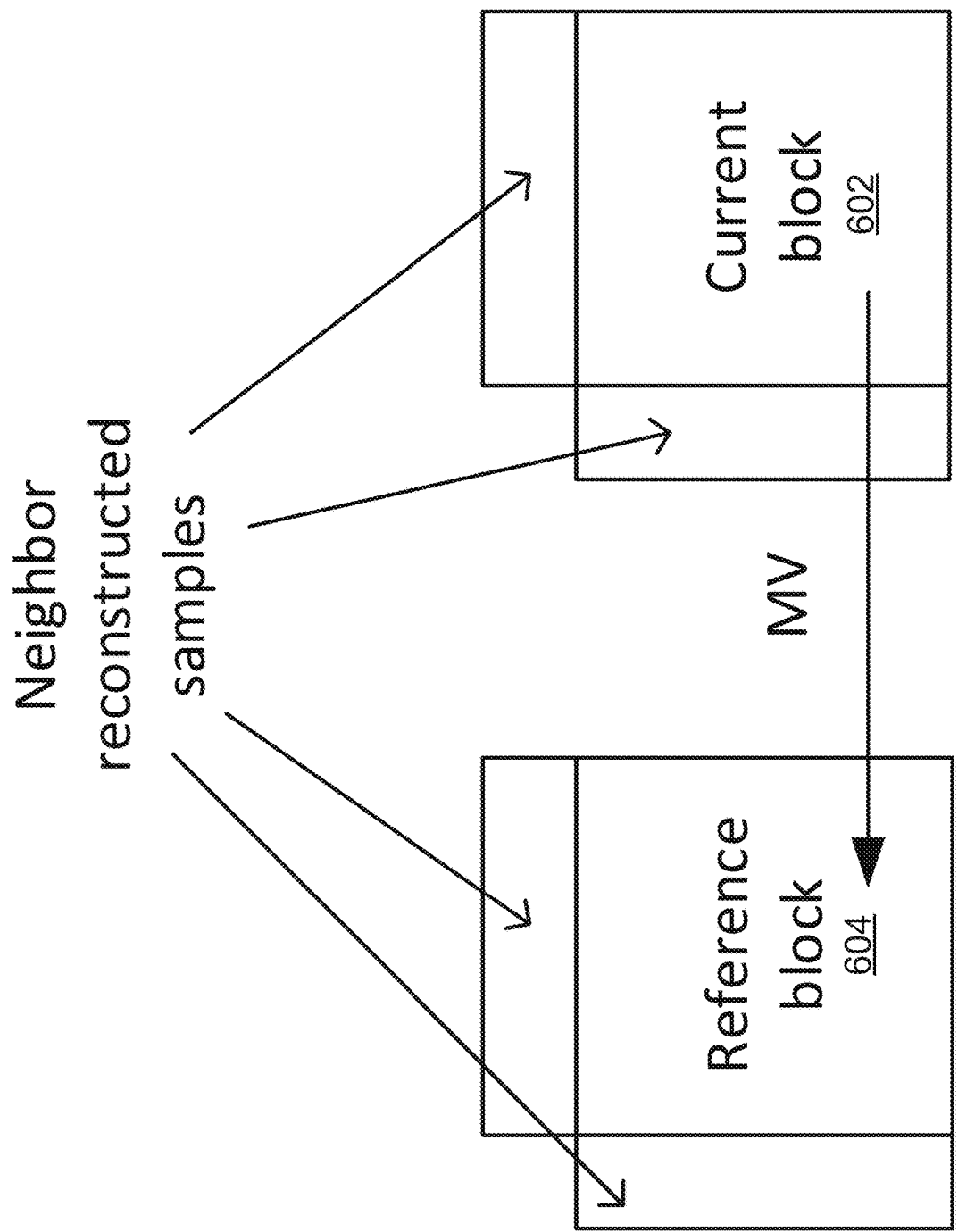
FIG. 6 is a conceptual diagram illustrating an example of neighbor reconstructed samples of a current block and neighbor samples of a reference block used for uni-directional inter-prediction, in accordance with some examples.

FIG. 6 is a diagram illustrating an example of neighbor reconstructed samples of a current block 602 and neighbor samples of a reference block 604 used for uni-directional inter-prediction. A motion vector MV can be coded for the current block 602, where the MV can include a reference index to a reference picture list and/or other motion information for identifying the reference block 604. For example, the MV can include a horizontal and a vertical component that provides an offset from the coordinate position in the current picture to the coordinates in the reference picture identified by the reference index.

Figure 7:
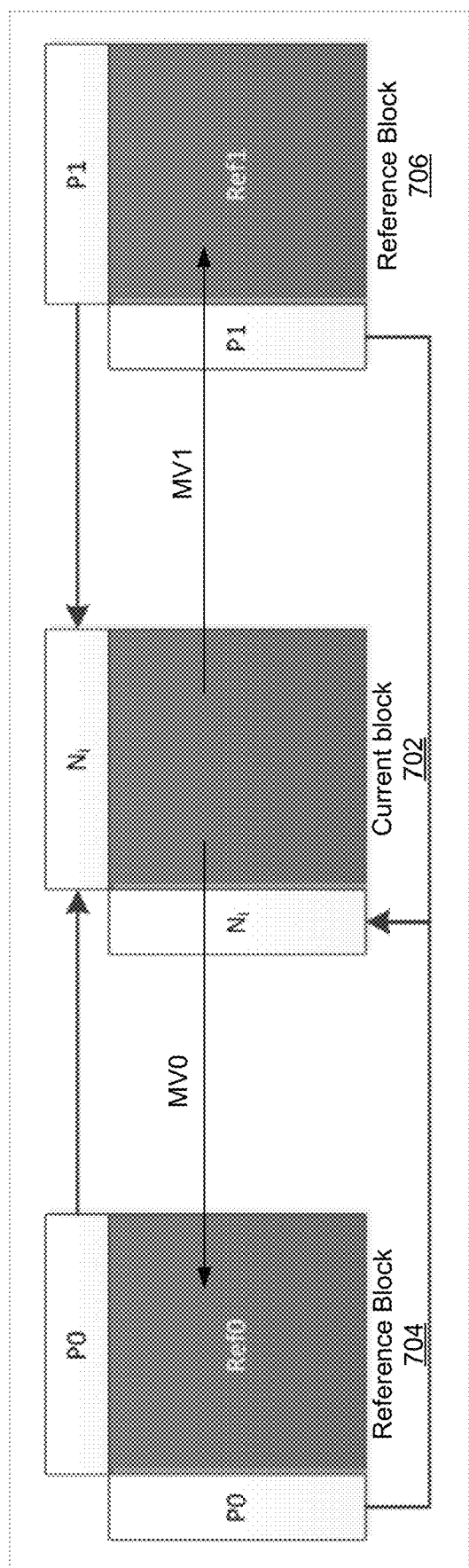
FIG. 7 is a conceptual diagram illustrating an example of neighbor reconstructed samples of a current block and neighbor samples of two reference blocks used for bi-directional inter-prediction, in accordance with some examples.

FIG. 7 is a diagram illustrating an example of neighbor reconstructed samples of a current block 702 and neighbor samples of a first reference block 704 and a second reference block 706 used for bi-directional inter-prediction. In this case, two motion vectors MV0 and MV1 can be coded for the current block 702 to identify the first reference block 704 and a second reference block 706, respectively.

Illumination compensation (IC) parameters can include an offset, one or more weights, a shift number, or other suitable illumination compensation parameters. A weight can also be referred to as a scaling factor. IC parameters can be derived for uni-directional inter-prediction or bi-directional inter-prediction. For bi-directional inter-prediction, the one or more weights can include a first weight for the first reference picture and a second weight for the second reference picture.

In some implementations, a linear least square regression can be used to estimate the LIC parameters in bi-predictive motion compensation. In one example, the derivation of the LIC parameters can be done by solving a cost function. For example, the cost function can include using a least-square function. For instance, a subset of samples from one or more neighboring blocks of the current block can be used to derive the LIC parameters. Samples from neighboring blocks of the current block can be used to find a possible illuminance changes in the current block 702, because it can be assumed that there is a strong correlation between the neighboring samples (in the neighboring blocks) and the current samples (in the current block 702). For instance, it can be assumed that the current block and the neighboring block, which share the same motion information, should contain very similar illuminance values. Another reason to use neighboring samples is that the current block has not yet been predicted, and there may not be pixels to use from the current block, in which case the neighboring samples (which have been reconstructed) can be used in performing the motion compensation of the current block.

In one illustrative example, either a top neighbor, a left neighbor, or both top neighbor and the left neighbor may be used. For instance, a subset of samples from a top neighbor and a left neighbor (Ni) for the current block 702, a subset of pixels from a top neighbor and a left neighbor (P0) of the first reference block 704, and a subset of pixels from a top neighbor and a left neighbor (P1) of the second reference block 706 can be used in deriving the IC parameters for the current block 702. The samples of the neighboring blocks P0 and P1 can include samples corresponding to the neighboring samples of the neighboring blocks $N_i$. In some cases, the corresponding samples used in the neighboring blocks P0 and P1 can be identified by motion information of the current block. In one illustrative example, the motion vectors can be signaled through either the merge mode or the AMVP mode. The reference pictures can be identified using their reference indexes, the reference blocks 704 and 706 within the reference pictures using the motion vectors MV0 and MV1, respectively.

In some examples, more than one derivation method to derive the LIC parameters can be performed. An example of an inter-prediction engine or module for deriving the LIC parameters at the encoder side can include the prediction processing unit 41, the motion estimation unit 42, and/or the motion compensation unit 44 shown in FIG. 13. An example of an inter-prediction engine or module for deriving the LIC parameters at the decoder side can include the prediction processing unit 81 and/or the motion compensation unit 82 shown in FIG. 13. In such examples, the encoder or other transmitter-side device can signal to the decoder which derivation method is to be used at a sequence level (e.g., in the VPS and/or the SPS), at the picture level (e.g., in the PPS), at the slice level (e.g., in the slice header), at the CTU level, at CU level, at PU level, or a combination thereof, or other suitable signaling level.

In some examples, the least square solution can be calculated based on multiple lines and/or columns of a neighbor (e.g., either top neighbor, a left neighbor, both the top and left neighbors, or other neighbors). Example numbers (and in some cases, the typical numbers) of lines and/or columns includes one, two, four, or any other suitable number of rows and/or columns. The cost functions mentioned above may be modified when multiple lines and/or columns of the neighboring block are used. For example, if the blocks are 16×16 blocks (16 rows of pixels by 16 columns of pixels), and if two lines from the top neighboring block and two columns from the left neighboring block are used, the neighboring block $N_i$ will include 64 samples (32 samples from the left neighboring block and 32 samples from the top neighboring block). In such an example, the neighbors P0 and P1 will also include 64 samples.

In some cases, integer-positioned samples (or pixels) are used for the derivation of the LIC parameters. In some cases, fractional-positioned samples are used for the derivation of the LIC parameters. In some cases, integer-positioned samples and fractional-positioned samples can both be used. For example, the true displacements of moving objects between pictures are continuous and tend to not follow the sampling grid of the pictures in a video sequence. Because of this, fractional accuracy can be used for motion vectors instead of integer accuracy, leading to a decrease in residual error and an increase in coding efficiency of video coders. If a motion vector has a fractional value, the reference block needs to be interpolated accordingly. For example, a motion vector for a sample of a current block can point to a fractional-pel position in a reference block. A fractional-pel position refers to samples (e.g., a luma sample) at fractional sample locations (non-integer locations) in the block. Such locations need to be generated by interpolation. In one example when factional-positioned samples are used, an interpolated or filtered version of the reference block neighbors (e.g., P0 or P1) can be used to reduce the quantization error from the reconstructed pixels when deriving the LIC parameters. Such an interpolated version of a template can be generated using one or more interpolation filters.

In some examples, only the luma component needs to be used to jointly optimize the LIC parameters for both Ref0 and Ref1. Alternatively, both luma and chroma components can be considered during the derivation of the bi-predictive LIC parameters. The encoder can signal to the decoder (in a parameter set, in an SEI message, or other suitable signaling mechanism) whether or not to apply LIC to one or more of the chroma components, or only to apply LIC to the luma components.

In some examples, one or more flags can be signaled between an encoder and a decoder at a block level to indicate whether particular tools have been applied (e.g., LIC, merge mode, among others) in the prediction of the block. For example, a merge mode flag can be stored with motion information for a current block. Whether the current block has been coded using merge mode can be inferred from the motion information based on the merge mode flag. In addition to the merge mode flag, an illumination compensation flag can also be used to indicate that the CU has been coded with When a CU is coded with merge mode, the illumination compensation flag can be copied from neighboring blocks, in a way similar to motion information copy in merge mode. Otherwise, if the CU has not been coded with merge mode (e.g., an AMVP mode was used instead), an illumination compensation flag can be signalled for the CU to indicate whether LIC applies or not.

There are challenges associated with deriving, coding, and signaling the LIC parameters. For example, considering the bi-directional inter-prediction discussed with reference to FIG. 7, the bi-directional prediction of the current block 702 can be considered to include two uni-directional predictions, a first uni-directional prediction using the first reference block (Ref0) 704 and a second uni-directional prediction using the second reference block (Ref1) 706. For deriving LIC parameters for the current block 702, illumination compensation can be applied to each of the two uni-directional predictions and then the uni-directional predictions can be weighted with illumination refinement to form a bi-directional prediction with illumination compensation. In some examples, the LIC parameters may be derived independently from the two uni-directional predictions using Ref0 and Ref1 without considering their joint influence on the bi-directional predictor. In some examples of the bi-prediction, separate LIC-compensated prediction patches are determined, and an equal weight (e.g., 0.5) may be used to combine the LIC-compensated prediction patches to generate the final bi-predictor.

In some examples of bi-directional prediction with illumination compensation, the LIC parameters are derived using neighboring reconstructed samples (e.g., from the neighboring blocks P0 and P1) for both of the uni-directional predictions. Although the stored neighboring reconstructed samples may be available in some cases, it is possible that such neighboring reconstructed samples may not be available for one or both reference blocks Ref0 and Ref1.

Furthermore, as previously mentioned an illumination compensation flag or LIC flag can be stored with motion information for a coded block. For example, the illumination compensation flag can be included with motion information for a current block coded using inter-prediction. In some examples, where a temporal motion vector predictor (TMVP) is used the motion information for the current block is obtained from the motion information for a reference block. In such examples pertaining to TMVP, the illumination compensation flag can be stored along with the motion information for the reference block which will be used for the current block. In various examples, storing the illumination compensation flag (e.g., with motion information for a current block, reference block, or in another form) can incur storage costs. It is desirable to minimize the storage for the illumination compensation flags where possible.

Systems, methods, and computer-readable media are described herein to address the above-mentioned problems (among others), and that provide solutions for harmonization and integration of illumination (or illuminance) compensation with other inter-prediction modes.

In some examples, various techniques are described for handling bi-directional inter-prediction (or bi-prediction). As noted above, illumination compensation can be performed during bi-predictive motion compensation. For example, as previously mentioned with reference to FIG. 7, conventional LIC algorithms for illumination compensation include deriving the two uni-directional LIC predictors and then apply weighting to the two uni-directional LIC predictors to obtain an illumination compensated bi-directional predictor.

In some examples, the above-mentioned challenges can be overcome by performing the bi-directional prediction without performing illumination compensation for each uni-directional prediction. For example, illumination compensation can be performed on the bi-directional predictor as a post-processing step. By avoiding the derivation of illumination compensation for each uni-directional prediction in the process of bi-directional inter-prediction, the complexity of solving the cost function using uni-directional predictions for illumination compensation can be avoided. Furthermore, avoiding the derivation of illumination compensation for each uni-directional prediction in the process of bi-directional inter-prediction also avoids the reliance on the neighboring blocks of both the first reference block and the second reference block in obtaining the LIC parameters. Correspondingly, bi-directional inter-prediction with illumination compensation can be performed in example techniques even when one or more neighboring blocks of one or both of the first reference block and the second reference block may be unavailable.

Figure 8:
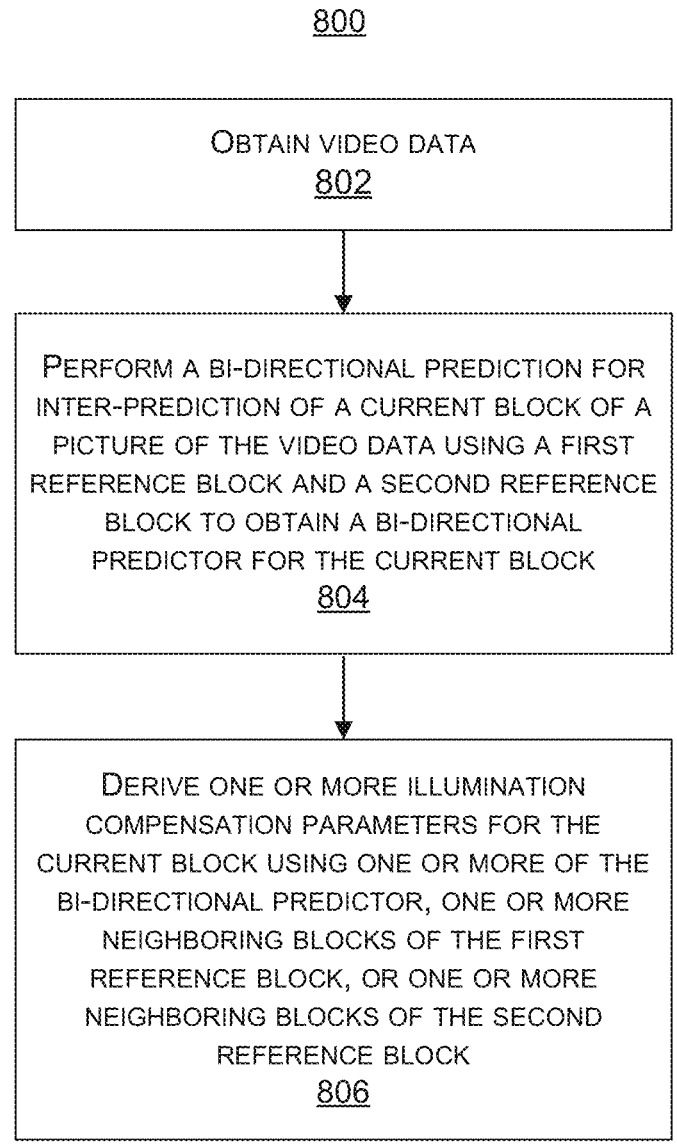
FIG. 8 is a flowchart illustrating an example of a process for applying illumination compensation to bi-directional prediction without performing illumination compensation during component uni-directional predictions, in accordance with some examples.

FIG. 8 is a flowchart illustrating an example of a process 800 of applying illumination compensation to bi-directional prediction without performing illumination compensation during component uni-directional predictions. At 802, the process 800 includes obtaining the video data. In some examples, the video data can include encoded video data (e.g., an encoded video bitstream), such as when the process 800 is performed by a decoding device. In some examples, the video data can include un-encoded video data, such as when the process 800 is performed by an encoding device. The video data can include a plurality of pictures, and the pictures can be divided into a plurality of blocks, as previously described. The video data can also include motion information for the pictures and/or blocks, which can be used to perform motion compensation.

At 804, the process 800 includes performing a bi-directional motion prediction for a current block of a picture of the video data using a first reference block and a second reference block to obtain a bi-directional predictor for the current block. In one illustrative example, the current block can be the current block 702 shown in FIG. 7, the first reference block can be the reference block 704, and the second reference block can be the reference block 706. Performing the bi-directional motion prediction (or bi-predictive motion compensation) for the current block 702 using the first reference block 704 and the second reference block 706 to obtain the bi-directional predictor for the current block 702 can include obtaining a first uni-directional predictor and a second uni-directional predictor. For example, obtaining the first uni-directional predictor can include deriving the motion vector MV0 among other motion information using the first reference block 704, and obtaining the second uni-directional predictor can include deriving the motion vector MV1 among other motion information using the first reference block 706. In some examples, performing the bi-predictive motion compensation excludes performing illumination compensation in obtaining the first uni-directional predictor and the second uni-directional predictor.

At 806, the process 800 includes deriving one or more illumination compensation parameters for the current block using one or more of the bi-directional predictor, one or more neighboring blocks of the first reference block, or one or more neighboring blocks of the second reference block. For example, LIC parameters for the current block 702 can be derived using the bi-directional predictor obtained at 804, and using the neighboring blocks P0 of the first reference block and/or the neighboring blocks P1 of the second reference block.

In some examples of the process 800, illumination compensation is performed for the current block 702 by deriving one or more illumination compensation parameters (or local illumination compensation, "LIC", parameters) after the bi-directional prediction is derived. For example, the illumination compensation parameters can be applied to the bi-directional predictor as a post processing operation for the bi-directional predictor. For example, a decoding device can apply the LIC parameters to a current block after the current block has been predicted using bi-directional prediction using the bi-directional predictor. In such examples, an inter-prediction module for performing the bi-directional prediction can be implemented without implementing illumination compensation. Moreover, since the reconstructed neighbor samples (e.g., the neighboring blocks P0, P1, etc.) need not be used in the bi-directional prediction, the inter-prediction module need not consider the reconstructed neighbor samples.

In some examples, the reconstructed neighbor samples (e.g., the neighboring blocks P0, P1, etc.) can be used for obtaining the illumination compensation parameters for the current block. For example, the LIC parameters can be derived using one or more neighboring blocks of a first reference block or one or more neighboring blocks of a second reference block. In some examples, the first reference block and the second reference block may be used for uni-directional predictions of the current block, where the first reference block and the second reference block may be referred to as uni-directional predictor blocks. A combination of the two uni-directional predictor blocks may be used for bi-directional prediction of the current block. In some examples, one or more neighbor samples of the uni-directional predictor blocks can be used for deriving the one or more illumination compensation parameters for the current block.

In some examples, one or more neighbor samples of the first reference block can be referred to as a first set of neighboring samples, and one or more neighbor samples of the second reference block can be referred to as a second set of neighboring samples. Accordingly, deriving the one or more illumination compensation parameters using neighboring blocks of the two uni-directional predictor blocks can include applying a combination of the first set of neighboring blocks and the second set of neighboring blocks to derive a single set of LIC parameters. For example, the combination of the first set of neighboring blocks and the second set of neighboring blocks can include a semi-sum, average, weighted average, or other combination of samples obtained from the first set of neighboring blocks and the second set of neighboring blocks. In some examples, weights used for a weighted average or weighted sum of the neighboring samples can include weighting coefficients used for a weighted inter-prediction of the current block.

In some examples, the above-mentioned challenges can be overcome by performing the bi-directional prediction without performing illumination compensation for each uni-directional prediction. For example, illumination compensation can be performed on the bi-directional predictor as a post-processing step. By avoiding the derivation of illumination compensation for each uni-directional prediction in the process of bi-directional inter-prediction, the complexity of solving the cost function using uni-directional predictions for illumination compensation can be avoided. Furthermore, avoiding the derivation of illumination compensation for each uni-directional prediction in the process of bi-directional inter-prediction also avoids the reliance on the neighboring blocks of both the first reference block and the second reference block in obtaining the LIC parameters. Correspondingly, bi-directional inter-prediction with illumination compensation can be performed in example techniques even when one or more neighboring blocks of one or both of the first reference block and the second reference block may be unavailable.

In another example technique for coding the current block, one or more aforementioned challenges associated with applying illumination compensation can be overcome by selectively avoiding illumination compensation in some cases. For example, if the current block is to be coded with bi-directional prediction, then illumination compensation for the current block may be suppressed or not performed. For example, illumination compensation can be disabled for a current block for which bi-directional prediction has been applied or is to be applied.

In some examples, disabling the illumination compensation can be implemented by suppressing or avoiding the signaling of the illumination compensation flag (or LIC flag). For example, when a motion vector candidate list is constructed for inter mode prediction of the current block using bi-directional prediction, the illumination compensation flag can be set to a "false" value. In some examples, the illumination compensation flag can be set to false for all bi-directional motion vector candidates.

In an alternative implementation, an illumination compensation flag can be stored along with the motion vector predictor for a current block, where the illumination compensation flag and the motion information can be propagated to other blocks which can be predicted with this information (e.g., in the merge mode). However, if bi-directional prediction is used for inter prediction of any block, then illumination compensation can be suppressed or not performed for that block even if the associated illumination compensation flag is set to a "true" value.

Figure 9:
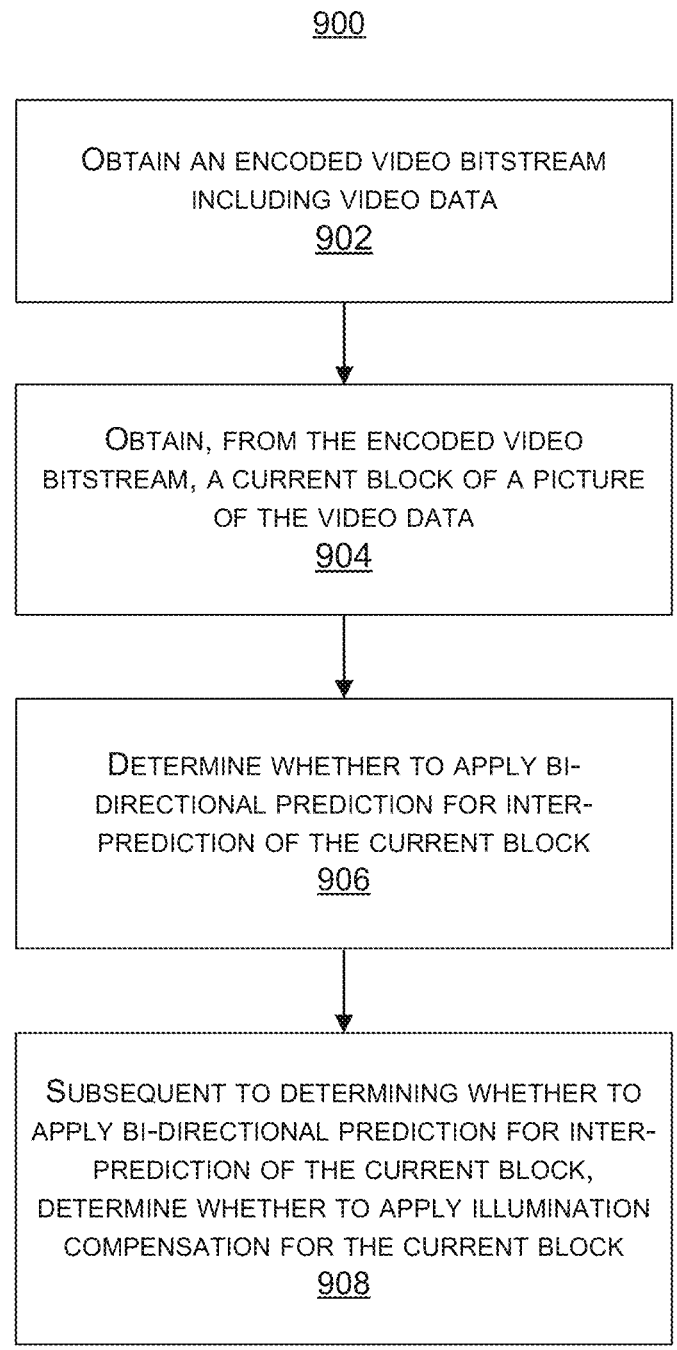
FIG. 9 is a flowchart illustrating an example of a process of decoding video data, including selectively applying illumination compensation based on whether bi-directional prediction is applied, in accordance with some embodiments.

FIG. 9 is a flowchart illustrating an example of a process 900 of decoding video data. In some examples, the process 900 can include selectively applying illumination compensation based on whether bi-directional prediction is applied. At block 902, the process 900 includes obtaining an encoded video bitstream including video data. At block 904, the process 900 includes obtaining, from the encoded video bitstream, a current block of a picture of the video data. In some examples, the video data can include encoded video data (e.g., in the encoded video bitstream), such as when the process 900 is performed by a decoding device. The video data can include a plurality of pictures, and the pictures can be divided into a plurality of blocks, as previously described. The video data can also include motion information for the pictures and/or blocks, which can be used to perform motion compensation.

At block 906, the process 900 includes determining whether to apply bi-directional prediction for inter-prediction of the current block of the picture of the video data. In some examples, information regarding whether bi-directional prediction is to be applied can be signaled or based on information stored or associated with the current block. For example, signaling from the encoding device to the decoding device can indicate whether the current block has been coded with bi-predictive motion compensation.

In some examples, an indication of whether to apply bi-directional prediction for inter-prediction of the current block can be based on an illumination compensation flag associated with motion information for inter-prediction of the current block. For example, a value of the illumination compensation flag being set to false can indicate that bi-directional prediction is to be applied for inter-prediction of the current block (and illumination compensation is not to be applied for the current block). On the other hand, a value of the illumination compensation flag being set to true can indicate that bi-directional prediction is not to be applied for inter-prediction of the current block (and illumination compensation is to be applied for the current block).

In some examples, determining whether to apply bi-directional prediction for inter-prediction of the current block can based on whether the signaling information includes an illumination compensation flag associated with motion information for the current block. For example, the signaling information not including an illumination compensation flag can indicate that bi-directional prediction is to be applied for inter-prediction of the current block (and illumination compensation is not to be applied for the current block).

In some examples, the motion information for the current block can be inherited. For example, in a merge mode, the motion information for the current block can be inherited from the motion information of a neighboring block or another block in a candidate list. In some examples, the illumination compensation flag can be stored along with motion information for the current block in a motion vector candidate list which includes the motion information for the current block.

In some examples, information regarding whether bi-directional prediction is to be applied can be determined. For example, applying bi-directional prediction for the current block can include using a first reference block and a second reference block to obtain a bi-directional predictor for the current block. Considering the illustrative example of FIG. 7, determining whether to apply bi-predictive motion compensation for the current block 702 can be based on whether the first reference block 704 and the second reference block 706 can be used for respectively obtaining the first uni-directional predictor and the second uni-directional predictor. In some examples, the first reference block 704 and the second reference block 706 can be used for respectively obtaining the first uni-directional predictor and the second uni-directional predictor if the first reference block 704 and the second reference block 706 are available. In some cases, one or both of the first reference block 704 and the second reference block 706 may be unavailable, and correspondingly, bi-predictive motion compensation may not be applied for the current block 702.

At block 908, the process 900 includes, subsequent to determining whether to apply bi-directional prediction for inter-prediction of the current block, determining whether to apply illumination compensation for the current block. For example, subsequent to the determination at block 906, a determination may be made as to whether illumination compensation is to be applied for the current block. In some examples, the determination as to whether illumination compensation is to be applied for the current block can be based on whether bi-directional prediction is to be applied for the inter-prediction of the current block. For example, if bi-directional prediction is to be applied for the current block, then illumination compensation for the current block can be avoided or suppressed. In some examples, the illumination compensation flag can indicate whether illumination compensation is to be applied. For example, the illumination compensation flag being set to false indicates that illumination compensation is not to be applied for the current block. Otherwise, the illumination compensation flag being set to true can indicate that that illumination compensation is to be applied for the current block. In some examples, if it is determined that bi-directional prediction is to be applied for the current block, then the illumination compensation flag may be set to false. By avoiding, suppressing, or disabling illumination compensation when bi-directional prediction is used for inter-prediction of the current block, the challenges associated with applying illumination compensation for bi-directional predicted blocks can be avoided.

In some examples, applying illumination compensation for the current block can include deriving one or more illumination compensation parameters for the current block using one or more neighboring blocks of current block and one or more neighboring blocks of a reference block used for inter-prediction of the current block. For example, as previously explained the luminance value (of a sample, or pixel) can be compensated for in the inter-prediction in a linear form, $a*p+b$, where p is a sample in inter-prediction, a is a scaling factor, and b is an offset. The scaling factor a and offset b are parameters which can be derived using neighboring samples of the current block and neighboring samples of the reference block (e.g., as shown in FIG. 5A and FIG. 5B). In some examples, the one or more neighboring blocks of the current block can include one or more of a top neighboring block or a left neighboring block of the current block, and the one or more neighboring blocks of the reference block can include one or more of a top neighboring block or a left neighboring block of the reference block.

In another example technique for coding the current block, one or more aforementioned challenges associated with applying illumination compensation can be overcome by selectively avoiding illumination compensation in some cases. For example, if the current block is to be coded with bi-directional prediction, then illumination compensation for the current block may be suppressed or not performed. For example, illumination compensation can be disabled for a current block for which hi-directional prediction has been applied or is to be applied.

As previously mentioned, the illumination compensation flag (or LIC flag) can be stored along with motion information for the current block. In some examples, the illumination compensation flag can be set to false for all bi-directional motion vector candidates. In some examples, illumination compensation can be avoided even if the illumination compensation flag indicates otherwise (e.g., is set to true). For example, if the illumination compensation flag set to true has been inherited from another block, but bi-directional motion compensation is to be performed for the current block, then illumination compensation for the current block may be avoided based on the determination that bi-directional motion compensation is to be applied to the current block.

As previously mentioned, the illumination compensation flag can be stored along with motion information for block. In some examples, the stored illumination compensation flag can be inherited along with the associated motion information. For example, the illumination compensation flag and motion information of a neighboring block can be inherited and used for motion prediction of a current block (e.g., in the merge mode). In some examples, motion prediction of the current block can include using the inherited motion information without modification. In such examples, illumination compensation can be performed for the current block based on the value of the inherited illumination compensation flag. For example, the inherited motion vectors from the neighboring block can be used as the motion vectors for the current block, and illumination compensation can be performed if the inherited illumination compensation flag from the neighboring block is true. In such examples, the LIC parameters can also be inherited from the neighboring block and used as the LIC parameters for the current block if the illumination compensation flag is true.

In other examples, motion prediction of the current block can include deriving the motion information for the current block from the motion information of another block, such as a neighboring block. In such examples, deriving the motion information for the current block can include modifying the motion information of the neighboring block or another block (e.g., in the AMVP or TMVP mode). For example, in a TMVP mode, the motion vector of a neighboring block may be scaled and the scaled motion vector can be used as a motion vector of the current block. In a pair-wise motion vector derivation, two motion vectors MV and MV2 of two neighboring blocks can be used in deriving the motion vector MV of the current block. For example, the motion vector MV of the current block can be derived as a semi-sum of the two motion vectors MV1 and MV2, where MV=(MV1+MV2)/2. In such examples (among others) the motion vector of the current block may be different from the one or more motion vectors of other blocks used in deriving the motion vector of the current block. When the motion vector of the current block may be different from the one or more motion vectors of other blocks used in deriving the motion vector of the current block, inheriting the illumination compensation flag for the current block from the one or more other blocks can be problematic. For example, the derived (modified) motion vector for the current block may point to a block in the reference picture which is different from the block pointed to by the one or more motion vectors (unmodified) of other blocks. Correspondingly, illumination compensation may not be needed for the current block whose motion information is derived from the motion vectors of one or more other blocks even if illumination compensation was performed for one or more of the other blocks (or the inherited illumination compensation flag is true).

Figure 10:
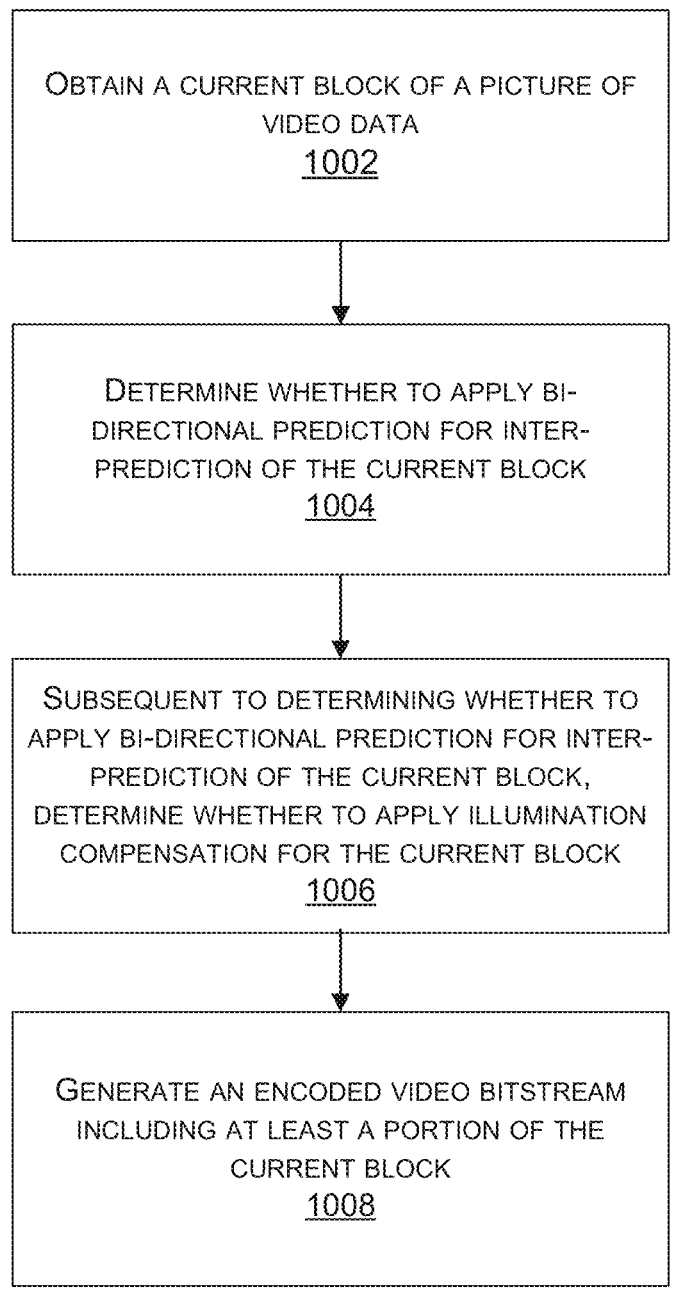
FIG. 10 is a flowchart illustrating an example of a process of encoding video data, including selectively applying illumination compensation based on whether bi-directional prediction is applied, in accordance with some embodiments.

FIG. 10 is a flowchart illustrating an example of a process 1000 of encoding video data. In some examples, the process 1000 includes selectively applying illumination compensation based on whether bi-directional prediction is applied. At block 1002, the process 1000 includes obtaining a current block of a picture of video data. In some examples, the video data can include un-encoded video data, such as when the process 1000 is performed by an encoding device. The video data can include a plurality of pictures, and the pictures can be divided into a plurality of blocks, as previously described. The process 1000 can determine motion information for the pictures and/or blocks, which can be used to perform motion compensation.

At block 1004, the process 1000 includes determining whether to apply bi-directional prediction for inter-prediction of the current block of the picture of the video data. In some examples, an indication of whether to apply bi-directional prediction for inter-prediction of the current block can be based on an illumination compensation flag associated with motion information for inter-prediction of the current block. For example, a value of the illumination compensation flag being set to false can indicate that bi-directional prediction is to be applied for inter-prediction of the current block (and illumination compensation is not to be applied for the current block). On the other hand, a value of the illumination compensation flag being set to true can indicate that bi-directional prediction is not to be applied for inter-prediction of the current block (and illumination compensation is to be applied for the current block). In some examples, the illumination compensation flag can be stored. For example, the illumination compensation flag can be stored along with motion information for the current block in a motion vector candidate list comprising the motion information for the current block.

At 1006, the process 1000 includes, subsequent to determining whether to apply bi-directional prediction for inter-prediction of the current block, determining whether to apply illumination compensation for the current block. For example, determining whether to apply illumination compensation for the current block can be based on whether bi-directional prediction is to be applied for the inter-prediction of the current block. For example, if bi-directional prediction is to be applied for the current block, then illumination compensation for the current block can be avoided or suppressed. In some examples, the illumination compensation flag can indicate whether illumination compensation is to be applied. For example, the illumination compensation flag being set to false indicates that illumination compensation is not to be applied for the current block. Otherwise, the illumination compensation flag being set to true can indicate that that illumination compensation is to be applied for the current block. In some examples, if it is determined that bi-directional prediction is to be applied for the current block, then the illumination compensation flag may be set to false. By avoiding, suppressing, or disabling illumination compensation when bi-directional prediction is used for inter-prediction of the current block, the challenges associated with applying illumination compensation for bi-directional predicted blocks can be avoided.

As previously mentioned, the illumination compensation flag (or LIC flag) can be stored along with motion information for the current block. In some examples, the illumination compensation flag can be set to false for all bi-directional motion vector candidates. In some examples, illumination compensation can be avoided even if the illumination compensation flag indicates otherwise (e.g., is set to true). For example, if the illumination compensation flag set to true has been inherited from another block, but bi-directional motion compensation is to be performed for the current block, then illumination compensation for the current block may be avoided based on the determination that bi-directional motion compensation is to be applied to the current block.

At block 1008, the process 1000 includes generating an encoded bitstream including at least a portion of the current block. In some examples, the illumination compensation flag can be included in the encoded bitstream. In some examples, the illumination compensation flag can be signaled if it is determined that illumination compensation is to be applied for the current block. In some examples, not signaling the illumination compensation flag for the current block can indicate that illumination compensation is determined not to be applied for the current block.

Figure 11:
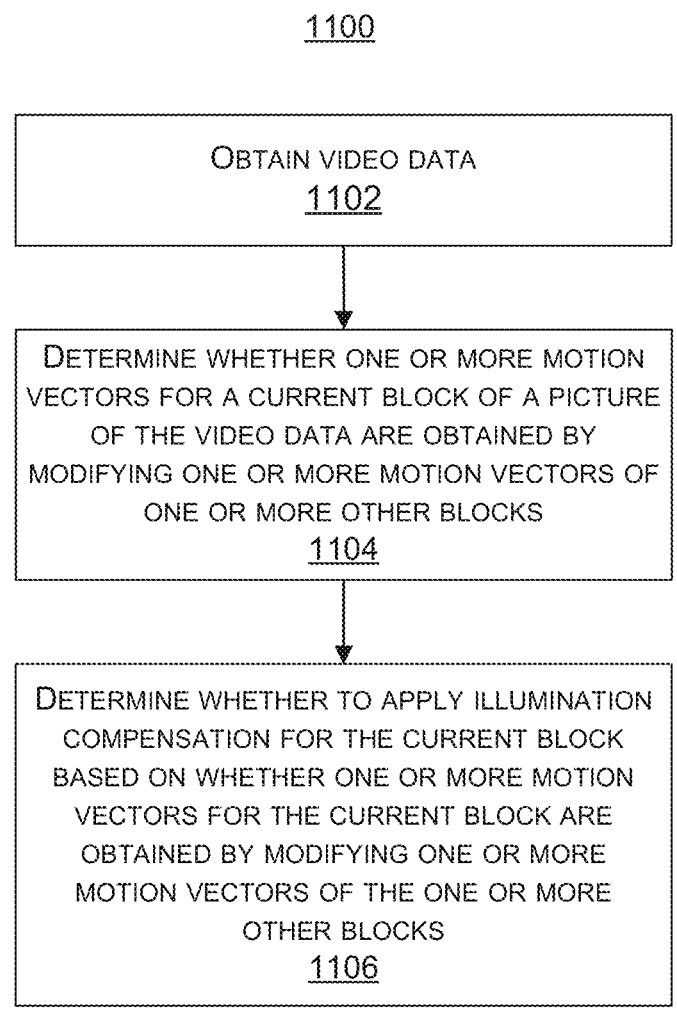
FIG. 11 is a flowchart illustrating another example of a process of selectively applying illumination compensation based on whether motion information obtained for inter-prediction has been modified, in accordance with some embodiments.

FIG. 11 is a flowchart illustrating an example of a process 1100 of processing video data by selectively applying illumination compensation based on whether motion information for a current block is obtained by modifying motion vectors of one or more other blocks. At 1102, the process 1100 includes obtaining the video data. In some examples, the video data can include encoded video data (e.g., an encoded video bitstream), such as when the process 1100 is performed by a decoding device. In some examples, the video data can include un-encoded video data, such as when the process 1100 is performed by an encoding device. The video data can include a plurality of pictures, and the pictures can be divided into a plurality of blocks, as previously described. The video data can also include motion information for the pictures and/or blocks, which can be used to perform motion compensation.

At 1104, the process 1100 includes determining whether one or more motion vectors for a current block of a picture of the video data are obtained by modifying one or more motion vectors of one or more other blocks. For example, the one or more motion vectors for the current block can be obtained by modifying (e.g., scaling or changing) one or more motion vectors of one or more previously coded blocks in a TMVP mode. In some examples, the one or more motion vectors for the current block can be obtained by modifying one or more motion vectors of one or more other blocks when the one or more motion vectors for the current block are obtained by performing an operation on one or more motion vectors of one or more other blocks. For example, the operation can include averaging, performing a semi-sum, a weighted sum, etc., on motion vectors of neighboring blocks used in pair-wise MV derivation.

At 1106, the process 1100 includes determining whether to apply illumination compensation for the current block based on whether one or more motion vectors for the current block are obtained by modifying one or more motion vectors of one or more other blocks. For example, if at 1104 it is determined that one or more motion vectors for the current block are obtained by modifying one or more motion vectors of one or more other blocks, then illumination compensation for the current block may be avoided or suppressed. For example, illumination compensation for the current block may be avoided or suppressed by setting the illumination compensation flag for the current block to be false.

In some examples, the illumination compensation flag may not be stored when the illumination compensation flag is set to false. For example, in the TMVP mode, the illumination compensation flag with value false can be prevented from being stored along with other motion information stored for the current block. In some examples, storage efficiencies can be realized by not storing the illumination compensation flag when the illumination compensation flag is set to false.

In some examples, illumination compensation can be performed for blocks which include partitions. One example of block partitions is triangular partitions described in Versatile Video Coding (VVC). VVC is a video coding standard being developed by JVET to provide a significant improvement in compression performance over the existing HEVC standard. In VVC, a block can be partitioned into to two triangular PUs using diagonal or anti-diagonal splits. Other types of block partitions can include different splits fir partitioning a block into two or more blocks of other shapes. For a block which has been partitioned, a local illumination compensation (LIC) flag can be derived, used, or signaled at a block level. However, an illumination compensation flag for the entire block may be representative of the illumination compensation needs for component blocks within the partitions. For example, an illumination compensation flag for a current block partitioned into triangular PUs may not be accurate or representative of LIC to be applied for both of the triangular PUs. For example, it may not be efficient or necessary to perform illumination compensation for both PUs of the block. Such problems can also be present in other partition modes (e.g., in VVC, HEVC, AVC, any MPEG standard, and/or other video coding standards).

In some examples, illumination compensation techniques are described to address such problems in partitioned blocks. In one example, more than one illumination compensation flag can be used for a partitioned block. For example, illumination compensation flags can be signaled at a PU level for one or more of two or more PUs present in a partitioned block. In another example, illumination compensation can be avoided or not used for a block which has partitioned to include more than one PU. In another example, illumination compensation parameters can be derived for a PU from the neighboring samples that share a border with the PU.

Figure 12D:
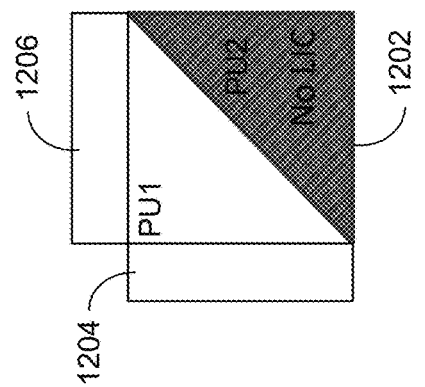
FIG. 12A-FIG. 12D are conceptual diagrams illustrating examples of triangular prediction units (PUs) and neighboring samples of the prediction units, in accordance with some examples.
Figure 12C:
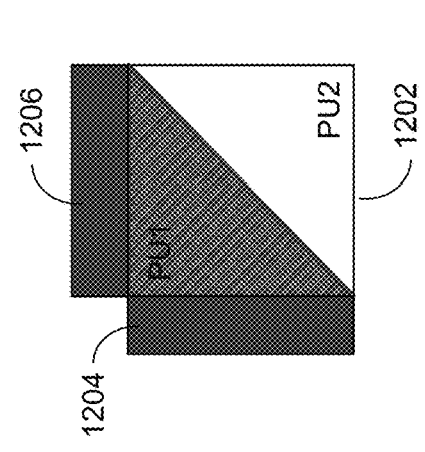
Figure 12B:
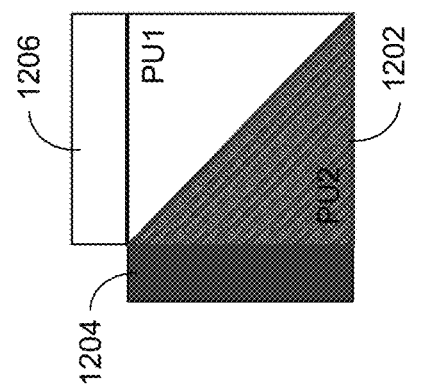
Figure 12A:
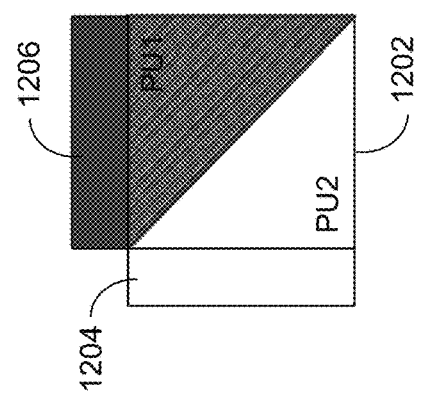

FIG. 12A. FIG. 12B, FIG. 12C, and FIG. 12D are conceptual diagrams illustrating examples of a block 1202 partitioned to include two triangular PUs, PU0 and PU1. The block 1202 is also shown to have two neighboring blocks, a left neighboring block 1204 and a top neighboring block 1206. PU0 and PU1 may have a neighbor (e.g., share a border with), none, one, or both of the neighboring blocks 1204 and 1206 based on how the block 1202 has been partitioned. The illumination compensation for PU0 and PU1 can be based on samples of their respective neighboring blocks, if any. In there are no neighbors for a PU, then illumination compensation is not performed for the PU.

For example, in FIG. 12A and FIG. 12B, PU1 shares a border with the top neighboring block 1206 and PU2 shares a border with the left neighboring block 1204. Accordingly, as illustrated in FIG. 12A, illumination compensation for PU1 can be based on samples of the top neighboring block 1206. Similarly, as illustrated in FIG. 12B, illumination compensation for PU2 can be based on samples of the left neighboring block 1204.

In FIG. 12C and FIG. 12D, PU shares a border with both the top neighboring block 1206 and the left neighboring block 1204, while PU0 does not share a border with any of the two neighboring blocks 1204 and 1206. Accordingly, as illustrated in FIG. 12C, illumination compensation for PU1 can be based on samples of both the top neighboring block 1206 and the left neighboring block 1204. As illustrated in FIG. 12D, illumination compensation is not performed for PU2.

As previously mentioned, the blocks can be partitioned into any other shapes or number of partitions. For example, the illumination compensation techniques based on samples of neighboring blocks (if any) with which a partition shares a border can be applied for any partitioning method (not only for triangular splits), such as blocks spit using a quad-split, a binary-split, a ternary split, and/or any other splitting.

In some example techniques described herein, illumination compensation can be applied based on other inter-coding tools which can be applied for coding one or more blocks of a picture. For example, illumination compensation on a block level may not lead to performance or quality improvement for blocks coded using some inter-coding techniques. For example, some blocks can be partitioned into sub-blocks as mentioned above. Inter-prediction of the sub-blocks can be based on using different motion vectors or motion models. For example, sub-block based prediction can be performed using tools such as alternative temporal motion vector prediction (ATMVP), affine prediction, among others. In one illustrative example, each sub-block (4×4, 8×8, or any other size) may have its own motion vector, and having one illumination compensation flag for all sub-blocks may not be accurate. However, signaling separate individual illumination compensation flags for each sub-block may also be expensive. For example, multiple illumination compensation flags used for signaling illumination compensation for multiple sub-blocks can incur expenses in terms of storage space, bandwidth, and processing needs, among other computing resources.

In some example techniques for addressing such problems which can arise for partitioned blocks, illumination compensation may be disabled for sub-blocks of a partitioned block. For example, if a block is partitioned into sub-blocks, each sub-block can have associated motion vector information specific to that sub-block as explained above. In some examples, an illumination compensation flag can be associated with the motion vectors for a sub-block and stored along with the motion vectors for the sub-block. In such examples where an illumination compensation flag is associated with a sub-block, the illumination compensation flag for the sub-block can be set to false. Correspondingly, illumination compensation can be avoided for sub-blocks whose illumination compensation flags associated with their respective motion information are set to false. By avoiding illumination compensation for a sub-block, related expenditure of computing resources can be avoided for the sub-block.

In another example, an illumination compensation flag may be derived from neighbor blocks as explained with reference to FIG. 12 to FIG. 12D above. For example, if a sub-block or PU shares a border with a neighboring block, the sub-block can derive an illumination compensation flag of the neighboring block. In some examples, the illumination compensation flag of a sub-block which shares a border with a neighboring block can be set to true. In such examples, the illumination compensation flag (derived from the neighboring block and/or set to true) can be associated with motion information to be used for coding the sub-block. In some cases, the illumination compensation flag can be stored along with the motion information for the sub-block and can be transferred or assigned to another block which is coded using the motion information of the sub-block. While in some examples, illumination compensation for a sub-block can be performed based on the value of the illumination compensation flag, according to techniques herein, illumination compensation can be avoided for sub-blocks regardless of the value of their associated illumination compensation flag. For example, even if a sub-block is encountered whose motion information includes an illumination compensation flag which is true, illumination compensation can be avoided for that sub-block. In this manner, expenditure of computing resources for performing the illumination compensation for sub-blocks can be avoided.

In some examples, the techniques described herein can be used for a merge with motion vector difference mode (MMVD mode), e.g., as described in VVC. In MMVD, a merge vector predictor can be used for which offsets can be added in performing motion vector prediction of a block. In some examples, when specific offsets are added to a merge vector predictor, illumination compensation can be disabled. In one example, when MMVD is performed for a block, the illumination compensation flag for the block can be set to false. In another example, the illumination compensation flag's value can be retained, but illumination compensation is not performed regardless of the illumination compensation flag's value (true or false). In some examples where illumination compensation flag can be signaled, the signaling can be prevented or suppressed when illumination compensation has been determined to be disabled or not applied.

In some examples, illumination compensation can be disabled for other techniques discussed herein by suppressing the signaling of the illumination compensation flag. For example, in the various above-described processes for selectively enabling or disabling (avoiding) illumination compensation for certain blocks, disabling the illumination compensation can be implemented by not signaling illumination compensation flags for the blocks for which illumination compensation has been determined to be disabled. For example, illumination compensation can be determined to be disabled when motion vectors for a current block have been obtained by modifying motion vectors of one or more other blocks as discussed with reference to 1006 of the process 1000 in FIG. 10. For example, the illumination compensation flag can be inherited for merge MV candidates but their motion vectors can include modified motion vectors. In such cases where the motion vector for a block is derived or obtained based on a modification of one or more other motion vectors, illumination compensation is disabled for the block, regardless of the value of the illumination compensation flag.

In another example of using the MMVD mode, illumination compensation for a block with modified motion vectors can be based on the nature of the modification. For example, illumination compensation can be performed for the block based on the value of an offset added to motion vectors of one or more other blocks in performing motion vector prediction of the block. In some examples, the motion vector prediction of the block can be based on an offset of a small value added to a motion vector of another block (e.g., a merge MV candidate block). In such examples where the offset value is small (e.g., smaller than a predefined threshold), the motion vector of the block would not include a large change relative to the motion vector of the other block used for the motion vector prediction. Thus, even though there may be a change in the motion information, since the change is considered to be small, illumination compensation can be performed for the block. However, if the offset is large (e.g., greater than the predefined threshold), then the illumination compensation can be disabled for the block. Accordingly, in some examples, by performing illumination compensation based on the amount of change or modifications in motion vectors obtained for motion vector prediction of a block, an improvement in accuracy or quality can be gained.

In some examples, a block may be both inter-predicted and intra-predicted. For example, VVC supports an intra+inter-prediction mode, where both inter- and intra-predictors are blended to form a block prediction. In such examples where both inter-prediction and intra-prediction are performed, performing illumination compensation can create a bottleneck because performing the illumination compensation would require both inter-prediction and intra-prediction to be completed and blended. Accordingly, to avoid the delays and complexity involved in applying illumination compensation in such cases, example techniques include disabling illumination compensation in the intra+inter-prediction mode. Thus, if a block is both inter-predicted and intra-predicted, illumination compensation for the block can be disabled.

According to some example techniques discussed herein, bandwidth reduction can be achieved in performing illumination compensation. For example, as described above, illumination compensation parameters for a block can be obtained using samples of neighboring blocks of one or more reference blocks. Correspondingly obtaining the LIC parameters for the current block can involve fetching the samples of the neighboring blocks and transmitting the samples to an illumination compensation engine. The fetching and transmitting of the samples can incur overhead in terms of bandwidth, storage, processing, among other computing resources.

In some examples, such overhead can be avoided by using samples of the reference block rather than samples of the neighboring block of the reference block. In some example, samples of the reference block can be obtained from a row and/or a column of the reference block, where the row and the column are adjacent to neighboring blocks of the reference block. For instance, a top row (or first row) of the reference block shown in FIG. 4B would be adjacent to neighboring pixels of the top neighbor, and a left column (or first column) of the reference block shown in FIG. 4B would be adjacent to neighboring pixels of the left neighbor. In some examples, the samples obtained from the top row of the reference block may not vary significantly from the samples obtained from the top neighbor of the reference block. Similarly, the samples obtained from the left column of the reference block may not vary significantly from the samples obtained from the left neighbor of the reference block. Thus, samples from the top row and/or the left column of the reference block instead of the corresponding top neighbor and/or the left neighbor of the reference block can be obtained for deriving LIC parameters for the current block. Obtaining samples from the top row and/or the left column of the reference block can avoid extra storage and overhead associated with obtaining the top neighbor and/or the left neighbor. For example, the samples of the reference block including the samples from the top row and the left column may be stored and transmitted anyway for deriving the motion information for the current block. Thus, using the samples from the top row and/or the left column of the reference block for illumination compensation may lead to efficiencies, since values of the samples obtained from the neighboring blocks and samples of the top row/left column of the reference block may be similar (by being spatially adjacent).

In some cases, the above techniques can be combined with interpolation. As previously explained, if a motion vector has a fractional value, the reference block needs to be interpolated accordingly. Interpolation can refer to motion-compensated interpolation (MCI) or inter-prediction interpolation. In some examples, illumination compensation can be performed for blocks interpolated using motion-compensation interpolation. In some cases, the samples of the reference block (e.g., from the top row and/or left column) used in illumination compensation of the current block can be utilized before motion-compensation interpolation is performed. In some cases, the samples of the reference block may be used in illumination compensation after motion-compensation interpolation is performed. In some examples, inter-prediction interpolation may be needed depending on the motion vector used because the motion vector need not indicate integer motion, but may include fractional-pel motion such as half-pel, quarter-pel, N-pel, or other fractional-pel motion compensation can be used.

In some examples, the process of using of samples of neighboring blocks of the reference block for illumination compensation can be improved by selectively reducing dependency on one or more of the neighboring blocks for obtaining the samples. For example, the illumination compensation parameters may be derived based only on of the two neighboring blocks which may be available for the reference block. For example, referring to FIG. 6 or FIG. 7, illumination compensation can be performed for the current block using only the left neighbor (but not the above-top neighbor) of each reference block used in the motion prediction of the current block. In another example, illumination compensation can be performed for the current block using only the top neighbor (but not the left neighbor) of each reference block used in the motion prediction of the current block. In other examples, less than all available immediate neighbors of a reference block can be used for illumination compensation of the current block.

In some examples, motion information comparison can be performed in constructing a motion vector candidate list. For example in a merge mode, a candidate list can be constructed to include motion information of previously predicted blocks. For avoiding redundancy and increasing storage efficiency, the motion information for a block to be added to the list can be compared with motion information which already exists in the list. In case there may be duplication, adding the motion information for the block can be prevented. While this is one example, motion information comparison can be performed in various other examples or processes of coding or decoding video data.

In some examples, an illumination compensation flag (or LIC flag) is included in the motion information, the illumination compensation flag may be used for motion information comparison. For example, in determining whether any two sets of motion information are the same or not, the values of the illumination compensation flags included in the two sets of motion information may also be compared. In one example, the motion information in the two sets may be considered different if their respective illumination compensation flags are not equal.

In some cases, it may not be possible or efficient to perform illumination compensation for a given block or prediction unit. For instance, illumination compensation can be disabled for certain types of prediction which can stipulate restrictions based on characteristics of the blocks. For example, there can be a block size restriction (e.g., illumination compensation may not be applied for certain block sizes), among other scenarios. In such cases when it is not possible or efficient to perform illumination compensation, the illumination compensation flags may not be considered in the motion information comparison. For example, motion information comparison can be performed by excluding the illumination compensation flag in determining whether or not two sets of motion information are the same or different. For example, when motion information is being compared, if the illumination compensation flags are not equal, but the rest of the motion information in the two sets is equal, then the two sets of motion information may be considered equal. In some examples, even though the illumination compensation flags may not be considered in motion information comparison, the illumination compensation flags included in the motion information can be used for illumination compensation. For example, even though the illumination compensation flags may be excluded in comparing the two sets of motion information, the illumination compensation flags in either or both of the sets of motion information can be used for illumination compensation of blocks predicted using the sets of motion information. For example, a set of motion information which includes an illumination compensation flag can be obtained from a motion candidate list created using the above techniques for motion information comparison, and the illumination compensation flag can be used to determine whether illumination compensation is to be performed for a block.

In some examples, illumination compensation flags can be excluded in motion information comparison regardless of the type of prediction that the motion information is used for. For example, whether to include the illumination compensation flag in the motion information comparison may not be based on a block size restriction or other criteria as discussed above. Rather, in some implementations, the illumination compensation flag can be excluded in all motion information comparisons. Excluding the illumination compensation flag from motion information comparison can simplify and improve efficiency of the motion information comparison, since the illumination compensation flag comparison is not performed when comparing motion information.

In some examples, motion information comparison can be used in a pruning process, which may be applied during the motion vector candidate list construction as mentioned above. In the pruning process, some motion candidates may be compared to each other and only unique candidates are added. In some examples, motion information comparison can be used to convert bi-directional prediction into uni-directional prediction. For example, such a technique can be performed when both uni-directional sets of motion information are determined to be the same based on motion information comparison of the two uni-directional sets of motion information. In such examples of using motion information (e.g., for pruning, converting bi-directional prediction into uni-directional prediction, and other examples), the illumination compensation flag can be considered or excluded according to techniques mentioned above for either including or excluding the illumination compensation flag in motion information comparison.

In some examples, illumination compensation can be applied to a portion of the prediction block. In one example, illumination compensation can be applied to prediction samples of a reference block based on their distance from neighboring samples. For example, a weighted function can be used for weighting samples of the reference block. In an example implementation of the weighted function, a higher weight can be assigned to samples of the reference block which are closer to a neighboring block (e.g., top neighbor or left neighbor) of the reference block, and a lower weight can be assigned to samples of the reference block which are farther away from the neighboring block. Using the weighted function and a predefined threshold for weights, illumination compensation can be applied for samples which are of higher weight (e.g., greater than a weight threshold) and closer to a neighboring block, while illumination compensation can be avoided for samples which are of lower weight (e.g., lower than the weight threshold).

In some examples, one or more of the above techniques can be combined. For example, one or more of the processes 800, 900, and 1000 described in FIG. 8, FIG. 9, and FIG. 10, respectively can be combined. For example, at 906, the process 900 of FIG. 9 can include determining that bi-directional prediction is to be applied for inter-prediction of the current block, and at 908, the process 900 of FIG. 9 can include determining that illumination compensation is to be applied for the current block. In some examples where illumination compensation is to be applied for the current block, illumination compensation parameters for the current block can be derived according to 806 of process 800 described with reference to FIG. 8. For example, illumination compensation parameters for the current block can be derived using one or more neighboring blocks of the current block and one or more of: a first set of one or more neighboring blocks of a first reference block used for inter-prediction of the current block, a second set of one or more neighboring blocks of a second reference block used for inter-prediction of the current block, or a combination of the first set of one or more neighboring blocks and the second set of one or more neighboring blocks.

In some examples, the one or more neighboring blocks of the current block can include one or more of a top neighboring block or a left neighboring block of the current block, the first set of one or more neighboring blocks can include one or more of a top neighboring block or a left neighboring block of the first reference block, and the second set of one or more neighboring blocks can include one or more of a top neighboring block or a left neighboring block of the second reference block. For example, as shown in FIG. 7, the one or more neighboring blocks of the current block 702 can include one or more of a top neighboring block Ni or a left neighboring block Ni of the current block, the first set of one or more neighboring blocks can include one or more of a top neighboring block P0 or a left neighboring block P0 of the first reference block 704, and the second set of one or more neighboring blocks can include one or more of a top neighboring block P1 or a left neighboring block P1 of the second reference block 706.

In some examples as previously discussed, illumination compensation flag can be considered in constructing a candidate motion information list. For example, if it is determined that an illumination compensation flag is associated with motion information for the current block, a determination may be made as whether to use the illumination compensation flag for comparing the motion information for the current block against stored motion information in a motion information candidate list, wherein the motion information for the current block is added to the motion information candidate list based on the comparison.

In some examples, as discussed with reference to FIG. 11, at step 1104, process 1100 can include determining whether one or more motion vectors for the current block are obtained by modifying one or more motion vectors of one or more other blocks. At step 1106, the process 1100 can include determining whether to apply illumination compensation for the current block based on whether one or more motion vectors for the current block are obtained by modifying one or more motion vectors of the one or more other blocks.

In some implementations, the processes (or methods) described herein can be performed by a computing device or an apparatus, such as the system 100 shown in FIG. 1. For example, the processes can be performed by the encoding device 104 shown in FIG. 1 and FIG. 13, by another video source-side device or video transmission device, by the decoding device 112 shown in FIG. 1 and FIG. 14, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of processes 800, 900, 1000, and 1100. In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams (including processes 800, 900, 1000, and 1100), the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 13:
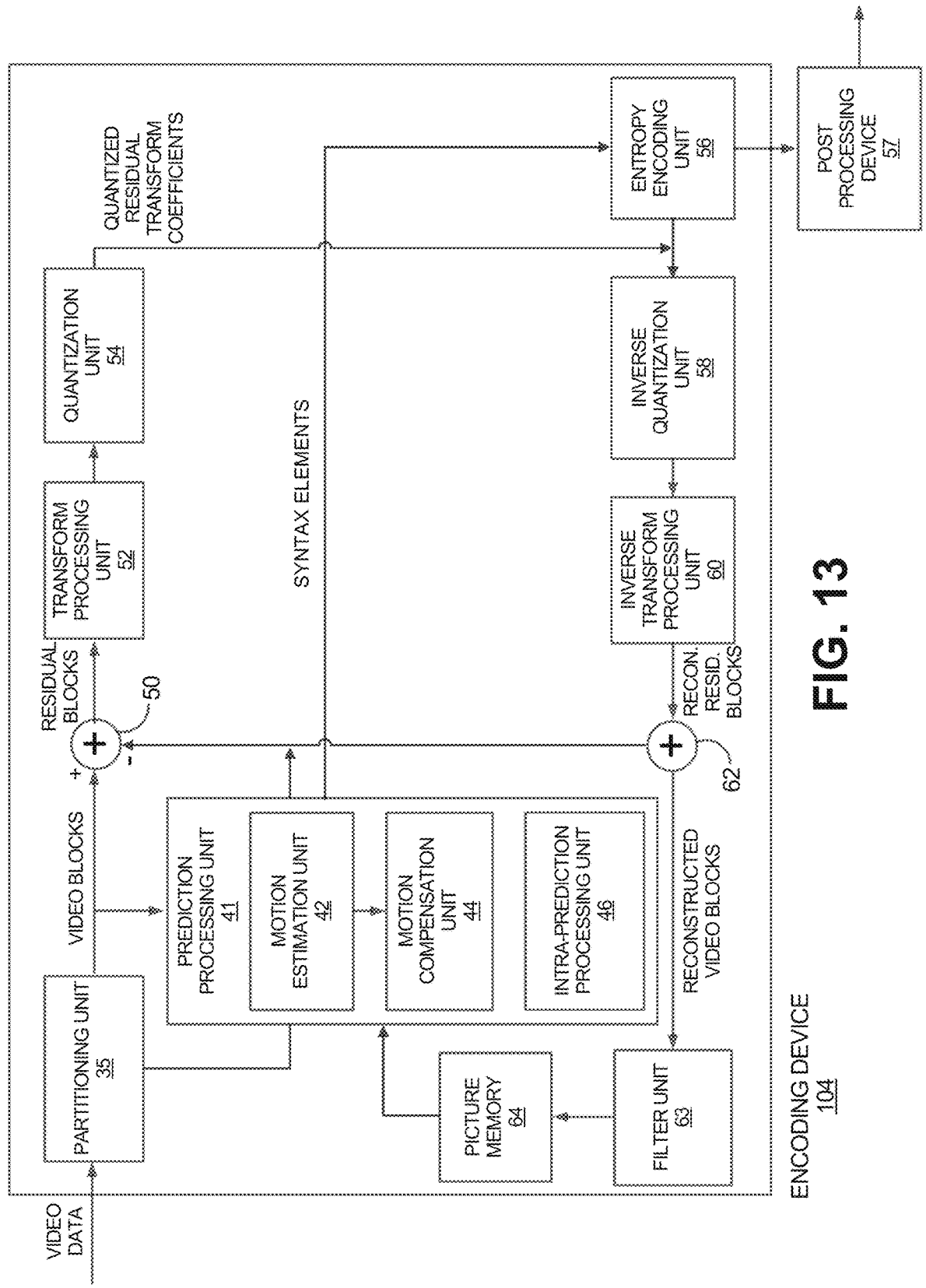
FIG. 13 is a block diagram illustrating an example video encoding device, in accordance with some examples.
Figure 14:
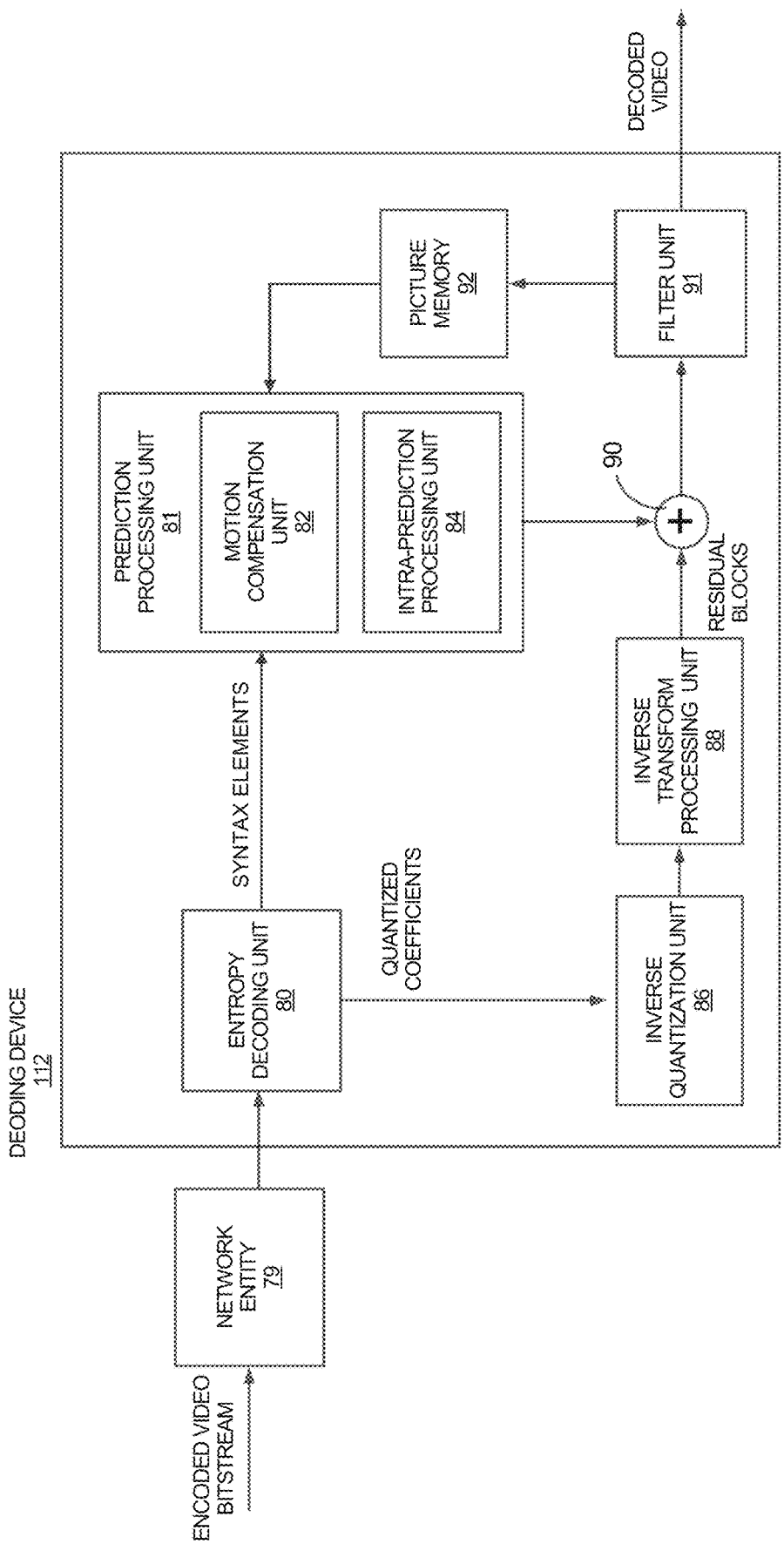
FIG. 14 is a block diagram illustrating an example video decoding device, in accordance with some examples.

Specific details of the encoding device 104 and the decoding device 112 are shown in FIG. 13 and FIG. 14, respectively. FIG. 13 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 13 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 13, the encoding device 104 receives video data, and partitioning unit 35 partitions the data into video blocks. The partitioning may also include partitioning into slices, slice segments, tiles, or other larger units, as wells as video block partitioning. e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 13 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above with respect to FIG. 8, FIG. 9 and FIG. 10. In some cases, some of the techniques of this disclosure may also be implemented by post processing device 57.

FIG. 14 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 14.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (1) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 14 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 14 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. For instance, the decoding device 112 may perform any of the techniques described herein, including the processes described above with respect to FIG. 8, FIG. 9, and FIG. 10.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory. USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "one or more of A, B, and C" and claim language reciting "one or more of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Example 1

A method of processing video data, the method comprising: obtaining the video data; determining a bi-directional predictor for a current block of the video data, the bi-directional predictor being determined by performing bi-directional inter-prediction for the current block; and performing illumination compensation on the bi-directional predictor.

Example 2

A method according to Example 1, wherein performing the illumination compensation on the bi-directional predictor includes: deriving one or more illumination compensation parameters for the bi-directional predictor; and applying the one or more illumination compensation parameters to the bi-directional predictor.

Example 3

A method according to Example 2, wherein the one or more illumination compensation parameters for the bi-directional predictor are derived using neighboring reconstructed samples.

Example 4

A method according to Example 3, wherein the neighboring reconstructed samples are from one or more of a first neighboring block of the current block and a second neighboring block of a reference block used for the bi-directional inter-prediction.

Example 5

A method according to Example 4, wherein the first neighboring block includes one or more of a top neighboring block or a left neighboring block of the current block, and wherein the second neighboring block includes one or more of a top neighboring block or a left neighboring block of the reference block.

Example 6

A method according to any of Examples 3-5, wherein deriving the one or more illumination compensation parameters for the bi-directional predictor includes minimizing a difference between reconstructed samples of the first neighboring block and reconstructed samples of the second neighboring block.

Example 7

A method according to any of Examples 2-6, wherein the one or more illumination compensation parameters are derived using neighboring samples of a predictor from a single reference picture list used during the bi-directional inter-prediction.

Example 8

A method according to any one of Examples 2-6, wherein the one or more illumination compensation parameters are derived using a combination of neighboring samples of predictors two reference picture lists used during the bi-directional inter-prediction.

Example 9

A method according to any one of Examples 3-8, wherein the neighboring reconstructed samples are not used when performing the bi-directional prediction.

Example 10

A method according to any one of Examples 1-9, wherein the illumination compensation is performed as a post-processing step after the bi-direction inter-prediction is performed for the current block.

Example 11

A method according to any one of Examples 1-10, wherein the bi-directional inter-prediction for the current block includes performing a first uni-directional prediction and a second uni-directional prediction to the current block.

Example 12

A method according to Example 11, wherein the bi-directional inter-prediction for the current block further includes applying a first weight to the first uni-directional prediction and a second weight to the second uni-directional prediction.

Example 13

A method according to any one of Examples 1-12, wherein the one or more local illumination compensation parameters include at least one scaling factor and at least one offset.

Example 14

A method according to any of Examples 1-13, wherein performing the illumination compensation on the bi-directional predictor results in an illumination compensated bi-directional predictor, and further comprising decoding the current block using the illumination compensated bi-directional predictor.

Example 15

A method according to any of Examples 1-13, further comprising signaling the one or more illumination compensation parameters in an encoded video bitstream.

Example 16

A method according to any of Examples 1-15, wherein the current block includes multiple prediction units (PUs), and further comprising signaling an illumination compensation flag for each prediction unit (PU) of the block.

Example 17

A method according to any of Examples 1-15, wherein illumination compensation is not performed for a block of the video data based on the block having more than one prediction unit.

Example 18

A method according to any of Examples 1-15, wherein the current block includes multiple prediction units (PUs), and wherein illumination compensation parameters for a PU of the current block are derived from neighbor samples that share a border with the PU.

Example 19

An apparatus comprising a memory configured to store video data and a processor configured to process the video data according to any of claims 1 to 18.

Example 20

An apparatus according to claim 19, wherein the apparatus includes a decoder.

Example 21

An apparatus according to Example 19, wherein the apparatus includes an encoder.

Example 22

An apparatus according to any one of Examples 16-21, wherein the apparatus is a mobile device.

Example 23

An apparatus according to any one of Examples 16-22, wherein the apparatus includes a display configured to display the video data.

Example 24

An apparatus according to any one of Examples 16-23, wherein the apparatus includes a camera configured to capture one or more pictures.

Example 25

A computer readable medium having stored thereon instructions that when executed by a processor perform the methods of any of Examples 1 to 18.

Example 26

A method of processing video data, the method comprising: obtaining the video data; determining bi-directional prediction is enabled for a current block of the video data; determining a bi-directional predictor for the current block, the bi-directional predictor being determined by performing bi-directional inter-prediction for the current block, wherein illumination compensation is disabled for the current block based on the bi-directional prediction being enabled.

Example 27

A method according to Example 26, wherein an illumination compensation flag is not signaled for the current block.

Example 28

A method according to Example 26, wherein an illumination compensation flag is set to false for bi-directional motion vector candidates in a motion vector candidate list.

Example 29

A method according to Example 26, wherein an illumination compensation flag is maintained with the bi-directional predictor, wherein illumination compensation is not performed for the current block when the illumination compensation flag is true and when bi-directional inter-prediction is performed for the current block.

Example 30

A method according to any of Examples 26-29, further comprising decoding the current block using the bi-directional predictor.

Example 31

An apparatus comprising a memory configured to store video data and a processor configured to process the video data according to any of Examples 26 to 30.

Example 32

An apparatus according to Example 31, wherein the apparatus includes a decoder.

Example 33

An apparatus according to Example 31, wherein the apparatus includes an encoder.

Example 34

An apparatus according to any one of Examples 31-33, wherein the apparatus is a mobile device.

Example 35

An apparatus according to any one of Examples 31-34, wherein the apparatus includes a display configured to display the video data.

Example 36

An apparatus according to any one of Examples 31-35, wherein the apparatus includes a camera configured to capture one or more pictures.

Example 37

A computer readable medium having stored thereon instructions that when executed by a processor perform the methods of any of Examples 26 to 30.

Clause 1: A method of decoding video data, the method comprising: obtaining an encoded video bitstream including video data; obtaining, from the encoded video bitstream, a current block of a picture of the video data; determining whether to apply bi-directional prediction for inter-prediction of the current block; and subsequent to determining whether to apply bi-directional prediction for inter-prediction of the current block, determining whether to apply illumination compensation for the current block.

Clause 2: A method according to clause 1, further comprising: determining whether to apply illumination compensation for the current block based on whether bi-directional prediction is to be applied for the inter-prediction of the current block.

Clause 3: A method according to clause 2, further comprising: determining that bi-directional prediction is to be applied for inter-prediction of the current block; and determining not to apply illumination compensation for the current block based on determining that bi-directional prediction is to be applied for inter-prediction of the current block.

Clause 4: A method according to any of clauses 2-3, further comprising: determining that bi-directional prediction is not to be applied for inter-prediction of the current block; and applying illumination compensation for the current block based on determining that determining that bi-directional prediction is not to be applied for inter-prediction of the current block.

Clause 5: A method according to clause 4, wherein applying illumination compensation for the current block comprises: deriving one or more illumination compensation parameters for the current block using one or more neighboring blocks of the current block and one or more neighboring blocks of a reference block used for inter-prediction of the current block.

Clause 6: A method according to any of clauses 2-5, wherein determining whether to apply bi-directional prediction for inter-prediction of the current block is based on an illumination compensation flag associated with motion information for the current block.

Clause 7: A method according to clause 6, wherein a value of the illumination compensation flag being set to false indicates that bi-directional prediction is to be applied for inter-prediction of the current block and illumination compensation is not to be applied for the current block.

Clause 8: A method according to any of clauses 6-7, wherein a value of the illumination compensation flag being set to true indicates that bi-directional prediction is not to be applied for inter-prediction of the current block and illumination compensation is to be applied for the current block.

Clause 9: A method according to any of clauses 2-8, further comprising: obtaining, from the encoded video bitstream, signaling information; determining whether the signaling information includes an illumination compensation flag associated with motion information for the current block; and determining whether to apply bi-directional prediction for inter-prediction of the current block based on determining whether the signaling information includes the illumination compensation flag associated with motion information for the current block.

Clause 10: A method according to clause 9, further comprising: determining that the signaling information does not include the illumination compensation flag; and determining that bi-directional prediction is to be applied for inter-prediction of the current block and illumination compensation is not to be applied for the current block, based on the signaling information not including the illumination compensation flag.

Clause 11: A method according to any of clauses 9-10, further comprising: applying one of bi-directional prediction for inter-prediction of the current block or illumination compensation for the current block; and reconstructing a sample of the current block based on the bi-directional prediction for inter-prediction applied to the current block or illumination compensation applied to the current block.

Clause 12: A method according to clause 11, wherein reconstructing the sample of the current block further comprises applying a residual value.

Clause 13: A method according to any of clauses 1-12, further comprising determining that bi-directional prediction is to be applied for inter-prediction of the current block; determining that illumination compensation is to be applied for the current block; and deriving illumination compensation parameters for the current block using one or more neighboring blocks of the current block and one or more of: a first set of one or more neighboring blocks of a first reference block used for inter-prediction of the current block, a second set of one or more neighboring blocks of a second reference block used for inter-prediction of the current block, or a combination of the first set of one or more neighboring blocks and the second set of one or more neighboring blocks.

Clause 14: A method according to clause 13, wherein the one or more neighboring blocks of the current block include one or more of a top neighboring block or a left neighboring block of the current block, the first set of one or more neighboring blocks includes one or more of a top neighboring block or a left neighboring block of the first reference block, and the second set of one or more neighboring blocks includes one or more of a top neighboring block or a left neighboring block of the second reference block.

Clause 15: A method according to any of clauses 1 to 14, further comprising: determining that an illumination compensation flag is associated with motion information for the current block; and determining whether to use the illumination compensation flag for comparing the motion information for the current block against stored motion information in a motion information candidate list, wherein the motion information for the current block is added to the motion information candidate list based on the comparison.

Clause 16: A method according to any of clauses 1 to 15, further comprising: determining whether one or more motion vectors for the current block are obtained by modifying one or more motion vectors of one or more other blocks; and determining whether to apply illumination compensation for the current block based on whether one or more motion vectors for the current block are obtained by modifying one or more motion vectors of the one or more other blocks.

Clause 17: An apparatus for decoding video data, the apparatus comprising: a memory; and a processor implemented in circuitry and configured to obtain an encoded video bitstream including video data; obtain, from the encoded video bitstream, a current block of a picture of the video data; determine whether to apply bi-directional prediction for inter-prediction of the current block; and subsequent to determining whether to apply bi-directional prediction for inter-prediction of the current block, determine whether to apply illumination compensation for the current block.

Clause 18: An apparatus according to clause 17, wherein the processor is further configured to: determine whether to apply illumination compensation for the current block based on whether bi-directional prediction is to be applied for the inter-prediction of the current block.

Clause 19: An apparatus according to clause 18, wherein the processor is further configured to: determine that bi-directional prediction is to be applied for inter-prediction of the current block; and determine not to apply illumination compensation for the current block based on determining that bi-directional prediction is to be applied for inter-prediction of the current block.

Clause 20: An apparatus according to clause 19, wherein the processor is further configured to: determine that bi-directional prediction is not to be applied for inter-prediction of the current block; and apply illumination compensation for the current block based on determining that determining that bi-directional prediction is not to be applied for inter-prediction of the current block.

Clause 21: An apparatus according to any of clauses 18-20, wherein determining whether to apply bi-directional prediction for inter-prediction of the current block is based on an illumination compensation flag associated with motion information for the current block.

Clause 22: An apparatus according to clause 21, wherein a value of the illumination compensation flag being set to false indicates that bi-directional prediction is to be applied for inter-prediction of the current block and illumination compensation is not to be applied for the current block.

Clause 23: An apparatus according to any of clause 21-22, wherein a value of the illumination compensation flag being set to true indicates that bi-directional prediction is not to be applied for inter-prediction of the current block and illumination compensation is to be applied for the current block.

Clause 24: An apparatus according to any of clauses 18-23, wherein the processor is further configured to: obtain, from the encoded video bitstream, signaling information; determine whether the signaling information includes an illumination compensation flag associated with motion information for the current block; and determine whether to apply bi-directional prediction for inter-prediction of the current block based on determining whether the signaling information includes the illumination compensation flag associated with motion information for the current block.

Clause 25: An apparatus according to clause 24, wherein the processor is further configured to: determine that the signaling information does not include the illumination compensation flag; and determine that bi-directional prediction is to be applied for inter-prediction of the current block and illumination compensation is not to be applied for the current block, based on the signaling information not including the illumination compensation flag.

Clause 26: An apparatus according to any of clauses 24-25, wherein the processor is further configured to: apply one of bi-directional prediction for inter-prediction of the current block or illumination compensation for the current block; and reconstruct a sample of the current block based on the bi-directional prediction for inter-prediction applied to the current block or illumination compensation applied to the current block.

Clause 27: An apparatus according to any of clauses 17-26, wherein the apparatus comprises a mobile device with a camera for capturing the one or more pictures.

Clause 28: An apparatus according to any of clause 17-27, further comprising a display for displaying the one or more pictures.

Clause 29: A non-transitory computer-readable medium having stored thereon instructions that, when executed by one or more processors, cause the one or more processors to: obtain an encoded video bitstream including video data; obtain, from the encoded video bitstream, a current block of a picture of the video data; determine whether to apply bi-directional prediction for inter-prediction of the current block; and subsequent to determining whether to apply bi-directional prediction for inter-prediction of the current block, determine whether to apply illumination compensation for the current block.

Clause 30: An apparatus for encoding video data, the apparatus comprising: a memory; and a processor implemented in circuitry and configured to: obtain a current block of a picture of video data; determine whether to apply bi-directional prediction for inter-prediction of the current block; subsequent to determining whether to apply bi-directional prediction for inter-prediction of the current block, determine whether to apply illumination compensation for the current block; and generate an encoded video bitstream including at least a portion of the current block.

Clause 31: An apparatus comprising a memory configured to store video data and a processor configured to process the video data according to any of Clause 1-16.

Clause 32: An apparatus according to Clause 31, wherein the apparatus includes a decoder.

Clause 33: An apparatus according to Clause 31, wherein the apparatus includes an encoder.

Clause 34: An apparatus according to any one of Clauses 31-33, wherein the apparatus is a mobile device.

Clause 35: An apparatus according to any one of Clauses 31-34, wherein the apparatus includes a display configured to display the video data.

Clause 36: An apparatus according to any one of Clauses 31-35, wherein the apparatus includes a camera configured to capture one or more pictures.

Clause 37: A computer readable medium having stored thereon instructions that when executed by a processor perform the methods of any of Clauses 26 to 30.

What is claimed is:

1. A method of decoding video data, the method comprising:
    obtaining an encoded video bitstream including video data;
    obtaining, from the encoded video bitstream, a current block of a picture of the video data;
    determining that a value of an illumination compensation flag associated with an additional block of the video data is to be inherited for at least one motion vector candidate of the current block, the value of the illumination compensation flag associated with the additional block indicating that illumination compensation is to be performed for the current block;
    determining whether the at least motion vector candidate of the current block is obtained by modifying one or more motion vectors of one or more other blocks of the video data; and
    determining whether to inherit the value of the illumination compensation flag for the at least one motion vector candidate based on whether the at least one motion vector candidate is obtained by modifying the one or more motion vectors.

2. The method of claim 1, further comprising:
    determining whether the at least one motion vector candidate of the current block is obtained using bi-directional prediction; and
    determining whether to inherit the value of the illumination compensation flag for the at least one motion vector candidate based on whether the at least one motion vector candidate is obtained using bi-directional prediction.

3. The method of claim 2, further comprising:
    based on a determination that the at least one motion vector candidate of the current block is not obtained using bi-directional prediction, inheriting the value of the illumination compensation flag for the at least one motion vector candidate, the value of the illumination compensation flag indicating that illumination compensation is to be applied.

4. The method of claim 3, further comprising determining, based on the value of the illumination compensation flag for the at least one motion vector candidate, to perform illumination compensation for the current block, wherein performing illumination compensation for the current block comprises:
    deriving one or more illumination compensation parameters for the current block using one or more neighboring blocks of the current block and one or more neighboring blocks of a reference block used for inter-prediction of the current block.

5. The method of claim 2, further comprising:
based on a determination that the at least one motion vector candidate of the current block is obtained using bi-directional prediction, setting a value of at least one illumination compensation flag of the at least one motion vector candidate to a false value, the false value indicating that illumination compensation is not to be applied.

6. The method of claim 1, further comprising:
determining that illumination compensation is to be applied for the current block; and
deriving illumination compensation parameters for the current block using one or more neighboring blocks of the current block and one or more of: a first set of one or more neighboring blocks of a first reference block used for inter-prediction of the current block, a second set of one or more neighboring blocks of a second reference block used for inter-prediction of the current block, or a combination of the first set of one or more neighboring blocks and the second set of one or more neighboring blocks.

7. The method of claim 6, wherein the one or more neighboring blocks of the current block include one or more of a top neighboring block or a left neighboring block of the current block, the first set of one or more neighboring blocks includes one or more of a top neighboring block or a left neighboring block of the first reference block, and the second set of one or more neighboring blocks includes one or more of a top neighboring block or a left neighboring block of the second reference block.

8. The method of claim 1, further comprising:
determining whether to use the illumination compensation flag for comparing motion information for the current block against stored motion information in a motion information candidate list, wherein the motion information for the current block is added to the motion information candidate list based on the comparison.

9. The method of claim 1, further comprising:
based on a determination that the least one motion vector candidate of the current block is not obtained by modifying the one or more motion vectors of the one or more other blocks, inheriting the value of the illumination compensation flag for the at least one motion vector candidate, the value of the illumination compensation flag indicating that illumination compensation is to be applied.

10. The method of claim 9, further comprising determining, based on the value of the illumination compensation flag for the at least one motion vector candidate, to perform illumination compensation for the current block, wherein performing illumination compensation for the current block comprises:
deriving one or more illumination compensation parameters for the current block using one or more neighboring blocks of the current block and one or more neighboring blocks of a reference block used for inter-prediction of the current block.

11. The method of claim 1, further comprising:
based on a determination that the at least one motion vector candidate of the current block is obtained by modifying the one or more motion vectors of the one or more other blocks, setting a value of at least one illumination compensation flag of the at least one motion vector candidate to a false value, the false value indicating that illumination compensation is not to be applied.

12. The method of claim 11, wherein the one or more motion vectors of the one or more other blocks are pairwise motion vector candidates.

13. An apparatus for decoding video data, the apparatus comprising:
a memory; and
a processor implemented in circuitry and configured to:
obtain an encoded video bitstream including video data;
obtain, from the encoded video bitstream, a current block of a picture of the video data;
determine that a value of an illumination compensation flag associated with an additional block of the video data is to be inherited for at least one motion vector candidate of the current block, the value of the illumination compensation flag associated with the additional block indicating that illumination compensation is to be performed for the current block;
determine whether the at least one motion vector candidate of the current block is obtained by modifying one or more motion vectors of one or more other blocks of the video data; and
determine whether to inherit the value of the illumination compensation flag for the at least one motion vector candidate based on whether the at least one motion vector candidate is obtained by modifying the one or more motion vectors.

14. The apparatus of claim 13, wherein the processor is further configured to:
determine whether the at least one motion vector candidate of the current block is obtained using b-directional prediction; and
determine whether to inherit the value of the illumination compensation flag for the at least one motion vector candidate based on whether the at least one motion vector candidate is obtained using bi-directional prediction.

15. The apparatus of claim 14, wherein the processor is further configured to:
based on a determination that the at least one motion vector candidate of the current block is not obtained using bi-directional prediction, inherit the value of the illumination compensation flag for the at least one motion vector candidate, the value of the illumination compensation flag indicating that illumination compensation is to be applied.

16. The apparatus of claim 15, wherein the processor is further configured to determine, based on the value of the illumination compensation flag for the at least one motion vector candidate, to perform illumination compensation for the current block, wherein, to perform illumination compensation for the current block, the processor is configured to:
derive one or more illumination compensation parameters for the current block using one or more neighboring blocks of the current block and one or more neighboring blocks of a reference block used for inter-prediction of the current block.

17. The apparatus of claim 14, wherein the processor is further configured to:
based on a determination that the at least one motion vector candidate of the current block is obtained using bi-directional prediction, set a value of at least one illumination compensation flag of the at least one motion vector candidate to a false value, the false value indicating that illumination compensation is not to be applied.

18. The apparatus of claim 13, further comprising at least one of a camera for capturing one or more pictures and a display for displaying the one or more pictures.

19. The apparatus of claim 13, wherein the processor is configured to:
   determine that illumination compensation is to be applied for the current block; and
   derive illumination compensation parameters for the current block using one or more neighboring blocks of the block of the video data and one or more of: a first set of one or more neighboring blocks of a first reference block used for inter-prediction of the current block, a second set of one or more neighboring blocks of a second reference block used for inter-prediction of the current block, or a combination of the first set of one or more neighboring blocks and the second set of one or more neighboring blocks.

20. The apparatus of claim 19, wherein the one or more neighboring blocks of the current block include one or more of a top neighboring block or a left neighboring block of the current block, the first set of one or more neighboring blocks includes one or more of a top neighboring block or a left neighboring block of the first reference block, and the second set of one or more neighboring blocks includes one or more of a top neighboring block or a left neighboring block of the second reference block.

21. The apparatus of claim 13, wherein the processor is configured to:
   determine whether to use the illumination compensation flag for comparing motion information for the current block against stored motion information in a motion information candidate list, wherein the motion information for the current block is added to the motion information candidate list based on the comparison.

22. The apparatus of claim 13, wherein the processor is further configured to:
   based on a determination that the at least one motion vector candidate of the current block is not obtained by modifying the one or more motion vectors of the one or more other blocks, inherit the value of the illumination compensation flag for the at least one motion vector candidate, the value of the illumination compensation flag indicating that illumination compensation is to be applied.

23. The apparatus of claim 22, wherein the processor is further configured to determine, based on the value of the illumination compensation flag for the at least one motion vector candidate, to perform illumination compensation for the current block, wherein, to perform illumination compensation for the current block, the processor is configured to:
   derive one or more illumination compensation parameters for the current block using one or more neighboring blocks of the current blocks and one or more neighboring blocks of a reference block used for inter-prediction of the current block.

24. The apparatus of claim 13, wherein the processor is further configured to:
   based on a determination that the at least one motion vector candidate of the current block is obtained by modifying the one or more motion vectors of the one or more other blocks, set a value of at least one illumination compensation flag of the at least one motion vector candidate to a false value, the false value indicating that illumination compensation is not to be applied.

25. The apparatus of claim 24, wherein the one or more motion vectors of the one or more other blocks are pairwise motion vector candidates.

26. A non-transitory computer-readable medium having stored thereon instructions that, when executed by one or more processors, cause the one or more processors to:
   obtain an encoded video bitstream including video data;
   obtain, from the encoded video bitstream, a current block of a picture of the video data;
   determine that a value of an illumination compensation flag associated with an additional block of the video data is to be inherited for at least one motion vector candidate of the current block, the value of the illumination compensation flag associated with the additional block indicating that illumination compensation is to be performed for the current block;
   determine whether the at least one motion vector candidate of the current block is obtained by modifying one or more motion vectors of one or more other blocks of the video data; and
   determine whether to inherit the value of the illumination compensation flag for the at least one motion vector candidate based on whether the at least one motion vector candidate is obtained by modifying the one or more motion vectors.

27. The non-transitory computer-readable medium of claim 26, further comprising instructions that, when executed by the one or more processors, cause the one or more processors to:
   determine whether the at least one motion vector candidate of the current block is obtained using bi-directional prediction; and
   determine whether to inherit the value of the illumination compensation flag for the at least one motion vector candidate based on whether the at least one motion vector candidate is obtained using bi-directional prediction.

28. The non-transitory computer-readable medium of claim 27, further comprising instructions that, when executed by the one or more processors, cause the one or more processors to:
   based on a determination that the at least one motion vector candidate of the current block is not obtained using bi-directional prediction, inherit the value of the illumination compensation flag for the at least one motion vector candidate, the value of the illumination compensation flag indicating that illumination compensation is to be applied.

29. The non-transitory computer-readable medium of claim 28, further comprising instructions that, when executed by the one or more processors, cause the one or more processors to determine, based on the value of the illumination compensation flag for the at least one motion vector candidate, to perform illumination compensation for the current block, wherein, to perform illumination compensation for the current block, the instructions, when executed by the one or more processors, cause the one or more processors to:
   derive one or more illumination compensation parameters for the current block using one or more neighboring blocks of the current block and one or more neighboring blocks of a reference block used for inter-prediction of the current block.

30. The non-transitory computer-readable medium of claim 27, further comprising instructions that, when executed by the one or more processors, cause the one or more processors to:
based on a determination that the at least one motion vector candidate of the current block is obtained using bi-directional prediction, set a value of at least one illumination compensation flag of the at least one motion vector candidate to a false value, the false value indicating that illumination compensation is not to be applied.

31. The non-transitory computer-readable medium of claim 26, further comprising instructions that, when executed by the one or more processors, cause the one or more processors to:
determine whether to use the illumination compensation flag for comparing motion information for the current block against stored motion information in a motion information candidate list, wherein the motion information for the current block is added to the motion information candidate list based on the comparison.

32. The non-transitory computer-readable medium of claim 26, further comprising instructions that, when executed by the one or more processors, cause the one or more processors to:
based on a determination that the at least one motion vector candidate of the current block is not obtained by modifying the one or more motion vectors of the one or more other blocks, inherit the value of the illumination compensation flag for the at least one motion vector candidate, the value of the illumination compensation flag indicating that illumination compensation is to be applied.

33. The non-transitory computer-readable medium of claim 32, further comprising instructions that, when executed by the one or more processors, cause the one or more processors to determine, based on the value of the illumination compensation flag for the at least one motion vector candidate, to perform illumination compensation for the current block, wherein, to perform illumination compensation for the current block, the instructions, when executed by the one or more processors, cause the one or more processors to:
derive one or more illumination compensation parameters for the current block using one or more neighboring blocks of the current block and one or more neighboring blocks of a reference block used for inter-prediction of the current block.

34. The non-transitory computer-readable medium of claim 26, further comprising instructions that, when executed by the one or more processors, cause the one or more processors to:
based on a determination that the at least one motion vector candidate of the current block is obtained by modifying the one or more motion vectors of the one or more other blocks, set a value of at least one illumination compensation flag of the at least one motion vector candidate to a false value, the false value indicating that illumination compensation is not to be applied.

35. The non-transitory computer-readable medium of claim 34, wherein the one or more motion vectors of the one or more other blocks are pairwise motion vector candidates.

36. An apparatus for encoding video data, the apparatus comprising:
a memory; and
a processor implemented in circuitry and configured to:
obtain a current block of a picture of video data;
determine that a value of an illumination compensation flag associated with an additional block of the video data is to be inherited for at least one motion vector candidate of the current block, the value of the illumination compensation flag associated with the additional block indicating that illumination compensation is to be performed for the current block;
determine whether the at least one motion vector candidate of the current block is obtained by modifying one or more motion vectors of one or more other blocks of the video data;
determine whether to inherit the value of the illumination compensation flag for the at least one motion vector candidate based on whether the at least one motion vector candidate is obtained by modifying the one or more motion vectors; and
generate an encoded video bitstream including at least a portion of the current block.

* * * * *